(12) United States Patent
Sassa

(10) Patent No.: US 7,528,864 B2
(45) Date of Patent: May 5, 2009

(54) PROCESSING APPARATUS AND COMPUTER PROGRAM FOR ADJUSTING GAMMA VALUE

(75) Inventor: Masayuki Sassa, Tokyo (JP)

(73) Assignee: Mega Vision Corporation, Tokyo (JP)

( * ) Notice: Subject to any disclaimer, the term of this patent is extended or adjusted under 35 U.S.C. 154(b) by 899 days.

(21) Appl. No.: 10/974,328

(22) Filed: Oct. 27, 2004

(65) Prior Publication Data

US 2005/0206754 A1    Sep. 22, 2005

(30) Foreign Application Priority Data

Mar. 18, 2004    (JP)    ............... 2004-079212
Aug. 25, 2004    (JP)    ............... 2004-245298

(51) Int. Cl.
*H04N 5/225*    (2006.01)

(52) U.S. Cl. .................. 348/218.1; 348/36; 348/37; 348/38; 348/39; 348/254

(58) Field of Classification Search ............. 348/218.1, 348/254, 36–39
See application file for complete search history.

(56) References Cited

U.S. PATENT DOCUMENTS

| | | | | |
|---|---|---|---|---|
| 2,253,292 | A * | 8/1941 | Goldsmith | ............... 348/218.1 |
| 5,386,228 | A * | 1/1995 | Okino | ............... 348/218.1 |
| 5,694,165 | A * | 12/1997 | Yamazaki et al. | ........ 348/218.1 |
| 6,349,153 | B1 | 2/2002 | Teo | |
| 2002/0141005 | A1* | 10/2002 | Okisu et al. | ................. 358/540 |
| 2002/0180765 | A1* | 12/2002 | Tanaka et al. | ................ 345/690 |
| 2003/0133019 | A1 | 7/2003 | Higurashi et al. | |

FOREIGN PATENT DOCUMENTS

| | | |
|---|---|---|
| GB | 2 354 388 A | 3/2001 |
| JP | 09-258350 | 10/1997 |
| JP | 09258350 A * | 10/1997 |

OTHER PUBLICATIONS

Farid H., Blind Inverse Gamma Correction, IEEE Transactions on Image Processing, vol. 10, No. 10 (Oct. 2001), pp. 1428-1433.*
European Search Report for EP 04256149.8; Date of Completion May 20, 2005.
Report on Research, Development, and Demonstrating Regarding New Video (High-Definition Video and the Like), Research, Development and Demonstration Experiment of Ultra Large Screen Video System; Fiscal 1999 Japan Keirin Association Sponsored Project (Machine Field); Mar. 2000; pp. 20-22 and 28-40; Development Committee of The Human Visual Center Foundation (HVC).

(Continued)

*Primary Examiner*—Sinh N Tran
*Assistant Examiner*—Anthony J Daniels
(74) *Attorney, Agent, or Firm*—Alston & Bird LLP

(57) ABSTRACT

To provide a processing apparatus for performing synthesis of video data to which video data of optically overlapped (duplicated overlap) video images are imparted. An image processor includes gamma removal units 810, 811, and 812 which remove gamma processing performed on video data to which video data of optically overlapped (duplicated overlap) video images are imparted, a video synthesis unit 825 which synthesizes video data adjacent to each other in the video data from which the gamma processing is removed, and a gamma addition unit 826 which re-performs gamma processing on the synthesized video data.

4 Claims, 14 Drawing Sheets

OTHER PUBLICATIONS

Report on Research, Development, and Demonstration Regarding New Video, Development and Verification Directed to Commercialization of Ultra Large Screen Video System; Fiscal 2000 Japan Keirin Association Sponsored Project (Machine Field); Mar. 2001; pp. 46-53; Development Committee of The Human Visual Center Foundation (HVC).

Report on Investigation/Research Project Regarding New Video, Investigation and Study Regarding Improvement of Seams of Ultra Large Screen Video System; Fiscal 2001 Japan Keirin Associated Sponsored Project (Machine Field); Mar. 2002; pp. 28-42; Digital Content Association of Japan.

* cited by examiner

PROCESSING APPARATUS AND COMPUTER PROGRAM FOR ADJUSTING GAMMA VALUE

CROSS REFERENCE TO RELATED APPLICATIONS

The disclosure of Japanese Patent Application No. JP 2004-79212 filed on Mar. 18, 2004 and Japanese Patent Application No. JP 2004-245298 filed on Aug. 25, 2004 including the specification, drawings and abstract are incorporated herein by reference.

BACKGROUND OF THE INVENTION

The present invention relates in general to video systems, and more particularly relates to a processing apparatus and a computer program for adjusting gamma value.

Conventional multi-wide video systems split one video image for capture (for example, refer to Non-Patent document 1, Non-Patent document 2, and Non-Patent document 3, below). Further, optically overlapped (duplicated overlap) video image generation processing is known as a process performed to improve the seams of the split and captured video images when stitching the video images together at the overlap (for example, refer to Non-Patent document 4, Non-Patent document 5, and Non-Patent document 6).

[Non-Patent document 1] "Report on Research, Development, and Demonstration Regarding New Video (Hi-Vision, High-Definition Video, and the Like), Master Concept for Ultra Large Screen Video System, by Fiscal 1998 Japan Keirin Association Sponsored Project (Machine Field)", pp. 27-34, March 1999, Development Committee of The High-tech Visual Promotion Center (HVC).

[Non-Patent document 2] "Report on Feasibility Study Regarding Development of Ultra Large Screen Video Capturing System for Events", pp. 15-23, March 2000, The Mechanical Social Systems Foundation, Consignee: The High-tech Visual Promotion Center.

[Non-Patent document 3] "Report on Feasibility Study Regarding Development of Ultra Large Screen Video Capturing System for Events", p. 35, June 2001, The Mechanical Social Systems Foundation, Consignee: Digital Content Association of Japan (The Former High-tech Visual Promotion Center (HVC)).

[Non-Patent document 4] "Report on Research, Development, and Demonstration Regarding New Video (High-Definition Video and the Like), Research, Development and Demonstration Experiment of Ultra Large Screen Video System, by Fiscal 1999 Japan Keirin Association Sponsored Project (Machine Field)", pp. 20-63, March 2000, Development Committee of The High-tech Visual Promotion Center (HVC).

[Non-Patent document 5] "Report on Research, Development, and Demonstration Regarding New Video, Development and Verification Directed to Commercialization of Ultra Large Screen Video System, by Fiscal 2000 Japan Keirin Association Sponsored Project (Machine Field)", pp. 46-54, March 2000, Development Committee of The High-tech Visual Promotion Center (HVC).

[Non-Patent document 6] "Report on Investigation/Research Project Regarding New Video, Investigation and Study Regarding Improvement of Seams on Ultra Large Screen Video System, by Fiscal 2001 Japan Keirin Association Sponsored Project (Machine Field)," pp. 28-42, March 2002, Digital Content Association of Japan.

SUMMARY OF THE INVENTION

However, in conventional video systems, the processing necessary by the processing apparatus to synthesize the video data to which video data of optically overlapped (duplicated overlap) video images are imparted was unknown.

Further, in conventional video systems, with regard to color temperatures and gamma values of two or three cameras, tuning is performed in advance to levels without large variations. However, in conventional video systems, there is also a case where somewhat fine adjustments are required. Accordingly, in conventional video systems, for example, a person checks the seams of the synthesized video images, such as between a left video image and a center video image, and between the center video image and a right video image, by means of a monitor. Then, the person adjusts the color temperatures and gamma values between the cameras so that degrees of brightness of the synthesized video images look the same. Therefore, conventional video systems require complicated preparation.

It is an object of the present invention to provide a processing apparatus which performs synthesis of video data to which video data of optically overlapped (duplicated overlap) video images are imparted.

Further, it is another object of the present invention to provide a gamma value adjustment computer program to automate the process required to adjust gamma setting values in a gamma removal table for removing gamma processing between video data to be synthesized based on gamma setting values in a gamma removal table starting from the value which is used for performing gamma removal processing for video data output from a predetermined camera when portions of optically overlapped (duplicated overlap) video images in video data are synthesized, and degrees of brightness thereof are simply added optically to realize uniform seams.

In order to attain the above objects of the present invention, the processing apparatus according to the invention comprises: a gamma removal unit removing gamma processing performed on each camera's video data to which video data of optically overlapped (duplicated overlap) video images are imparted, the optically overlapped (duplicated overlap) video images being generated by setting a splitting unit to split light at a position other than a position where the focal position of the main lens onto which light from an object is made incident and the focal position of the relay lens which guides split light coincide with each other; an addition unit synthesizing optically overlapped (duplicated overlap) adjacent video images in the video data from which the gamma processing is removed; and a gamma addition unit re-performing gamma processing on the synthesized video data.

Further, the processing apparatus according to the invention comprises: a first gamma removal unit which uses a look up table to remove gamma processing from the first video data to which video data of optically overlapped (duplicated overlap) video images are imparted, the optically overlapped (duplicated overlap) video images being generated by setting a splitting unit to split light at a position other than a position where the focal position of the main lens onto which light from an object is made incident and the focal position of the relay lens which guides split light coincide with each other; a second gamma removal unit which uses a look up table to remove gamma processing from the second video data to which video data of optically overlapped (duplicated overlap) video images are imparted, the optically overlapped (duplicated overlap) video images being generated by setting the splitting unit at a position other than a position where the focal position of the main lens onto which light from an object is made incident and the focal position of the relay lens which guides split light coincide with each other; a synthesizing unit synthesizing the first video data and the second video data; and a gamma addition unit which uses a look up table to re-perform gamma processing on video data synthesized by the synthesizing unit.

Further, the computer program for adjusting gamma value according to the invention comprises steps of: receiving input of a gamma value; performing a first determining step comprising determining whether or not brightness of a predetermined line is out of a predetermined range, the brightness being brightness of video data of a portion in which the first video data from which gamma processing is removed by the received gamma value and the second video data from which gamma processing is removed by a predetermined gamma value are synthesized; performing a second determining step comprising determining the brightness of the predetermined line when a result of determination by the first determining step indicates that the brightness is out of the predetermined range; changing at least one of the gamma value used in removing the gamma processing performed on the first video data and the gamma value used in removing the gamma processing performed on the second video data to reduce the brightness of the video data of the synthesized portion when a result of determination by the second determining step indicates that the predetermined line is shifted to a brighter direction; changing at least one of the gamma value used in removing the gamma processing performed on the first video data and the gamma value used in removing the gamma processing performed on the second video data to increase the brightness of the video data of the synthesized portion when the result of the determination by the second determining step indicates that the predetermined line is shifted to a darker direction; and causing the determination by the first determining step to be performed one more time.

DETAILED DESCRIPTION OF THE INVENTION

A best mode for carrying out the present invention will be described below with reference to the drawings. The configuration of the following embodiment is an illustration, and the present invention is not limited to the configuration of the embodiment.

<Entire Configuration>

Figure 1:
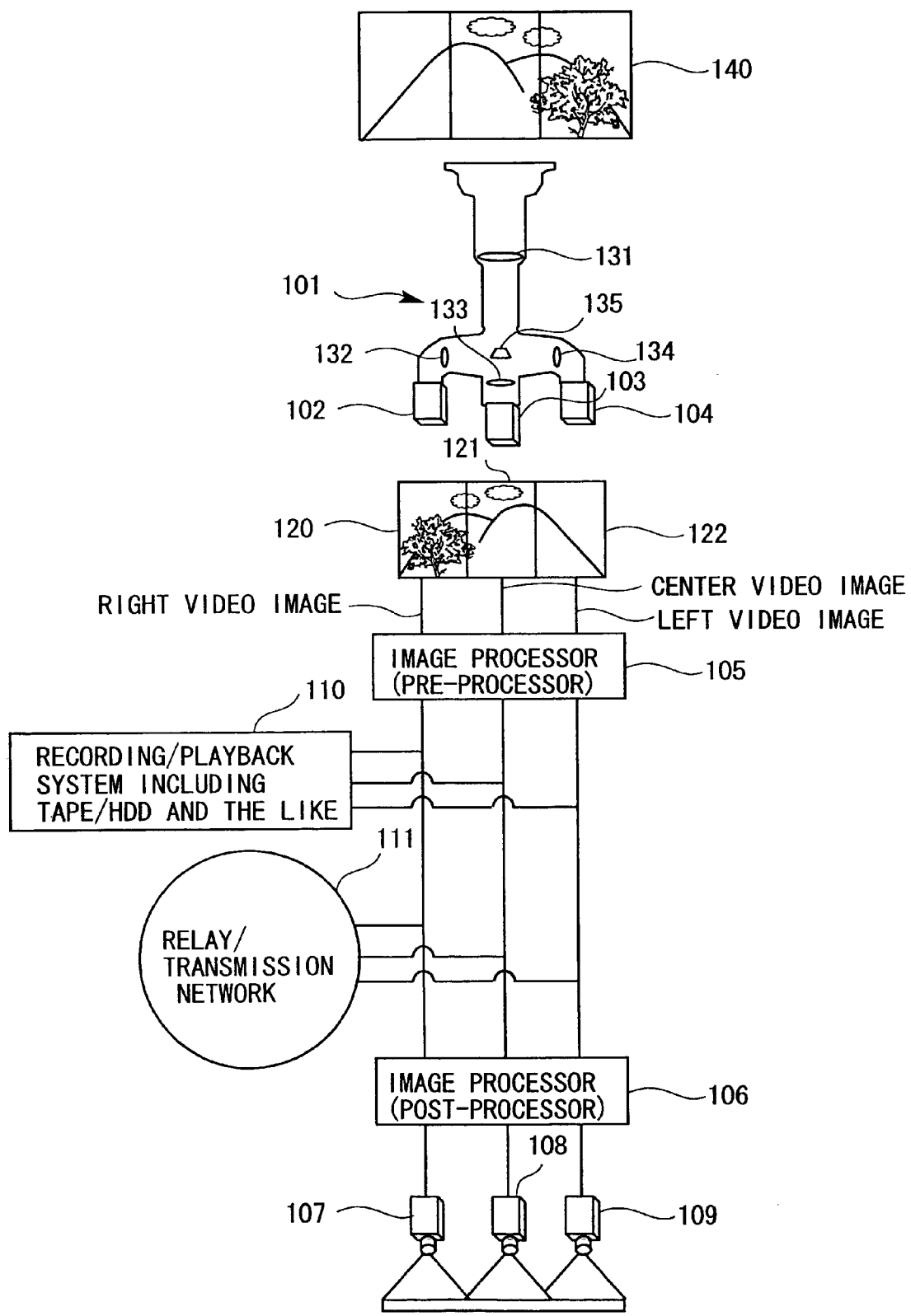
FIG. 1 is a diagram showing the entire configuration of the video system using the processing apparatus according to an embodiment of the present invention.

First, the entire configuration of the video system using the processing apparatus according to one embodiment of the present invention will be described with reference to FIG. 1. FIG. 1 is a diagram showing the entire configuration of the video system using the processing apparatus according to the one embodiment of the present invention. Note that FIG. 1 is a diagram showing the video system as viewed from above (bird's eye view).

As shown in FIG. 1, the video system using the processing apparatus according to the one embodiment of the present invention includes a lens unit 101, cameras 102, 103, and 104, image processors 105 and 106, and display systems 107, 108, and 109. It is not necessary to make the number of those display systems 107, 108, and 109 coincide with the number of cameras, and the number of the display systems 107, 108, and 109 may be an arbitrary number.

The image processor 105 is also called a pre-processor. The image processor 106 is also called a post-processor. The image processor 105 is one example of the processing apparatus of the present invention.

Further, a recording/playback system 110 and a relay/transmission network 111 are connectable to the video system shown in FIG. 1. Further, when the recording/playback system 110 and the relay/transmission network 111 are not connected to the video system, a local live broadcast is performed, for example.

The following description will be made by taking as an example the case where a video image is split into three. However, this embodiment is also applicable to the case where the video image is split into two.

<Lens Unit 101>

First, the lens unit 101 will be described. The lens unit 101 is composed of the main lens 131 onto which light from an object to be image-captured (hereinafter called the "object") 140 is made incident, a splitting unit 135 which splits light from the main lens 131, and relay lenses 132, 133, and 134 onto which light of video images split by the splitting unit 135 is made incident. Note that, though each of the main lens 131 and the relay lenses 132, 133, and 134 is illustrated as one lens in FIG. 1, actually, each of them is a combination of at least one or more lenses.

The main lens 131 can form a wide video image of video images captured by the three cameras into an image without any distortion. The relay lenses 132, 133, and 134 guide the split light to cameras 102, 103, and 104.

The splitting unit 135 is composed of a bi-splitting prism which splits the incident light into two, and a tri-splitting prism which splits the incident light into three.

Further, a video image of the right portion of the object 140 is vertically inverted and reaches the left relay lens 132 viewed from above (bird's eye view) the video system. Similarly, a video image of the center portion of the object 140 is vertically inverted and reaches the center relay lens 133 viewed from above (bird's eye view) the video system, and a video image of a left portion of the object 140 is vertically inverted and reaches the right relay lens 134 viewed from above (bird's eye view) the video system.

Figure 2:
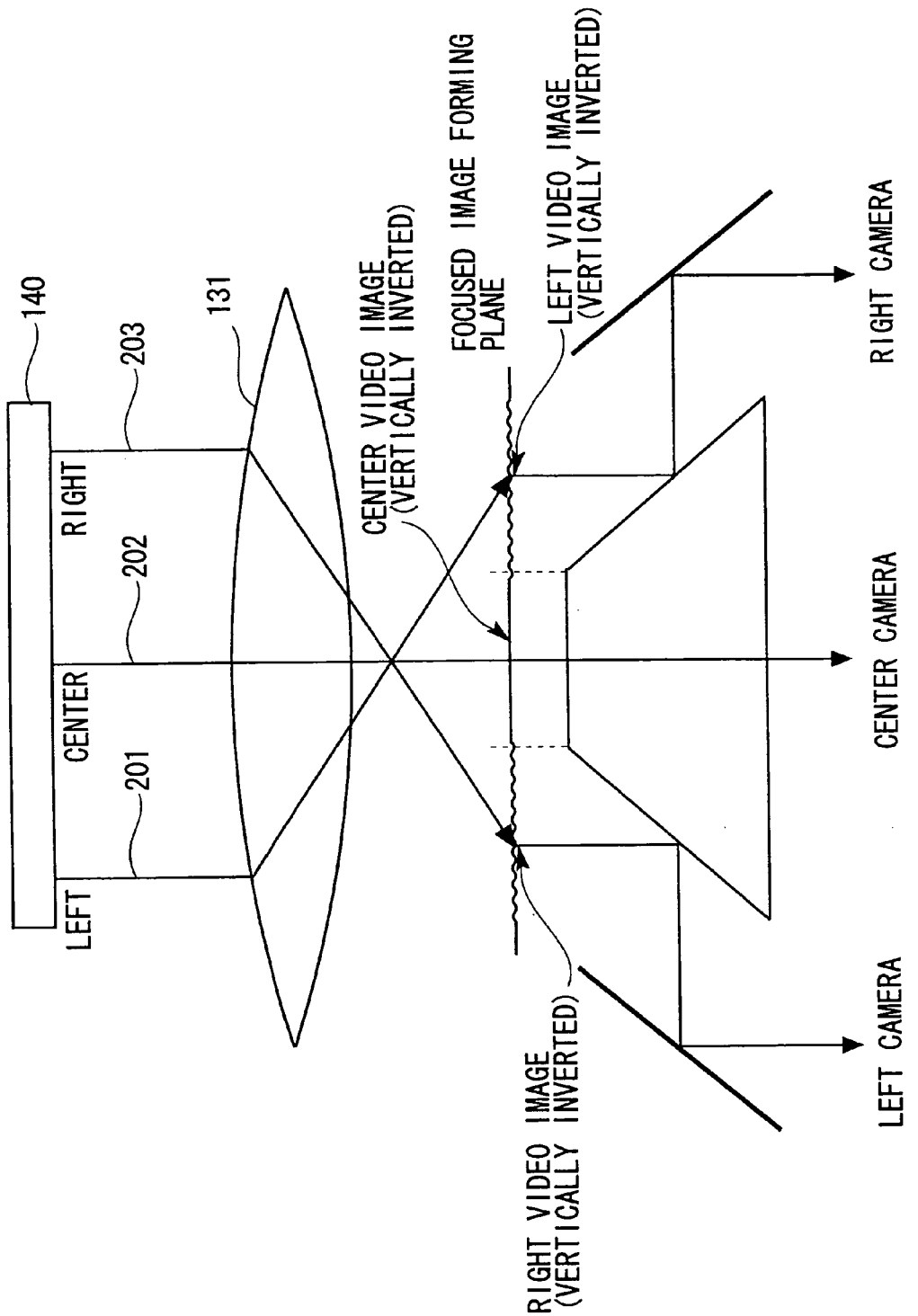
FIG. 2 is a conceptual diagram showing part of optical paths in the video system shown in FIG. 1.

Further, as shown in FIG. 2, the left-portion light 201 output from the object 140 is refracted and formed into an image by the main lens 131, and then refracted and formed into an image one more time through the relay lens. Accordingly, the light for the left video image, which is made incident onto the right camera, becomes an upright one. Further, the light for the left video image is horizontally inverted by the reflecting surface of the prism, and accordingly, horizontally inverted by a mirror. FIG. 2 is a conceptual view partially showing optical paths in the video system shown in FIG. 1.

Further, the center-portion light 202 output from the object 140 is refracted and formed into an image by the main lens 131, and then refracted and formed into an image one more time through the relay lens. Accordingly, the light for the center video image, which is made incident onto the center camera, becomes an upright one.

As shown in FIG. 2, the right-portion light 203 output from the object 140 is refracted and formed into an image by the main lens 131, and then refracted and formed into an image one more time by the relay lens. Accordingly, the light for the right video image, which is made incident onto the left camera, becomes an upright one. Moreover, this light for the right video image is horizontally inverted by the reflecting surface of the prism, and accordingly, horizontally inverted by a mirror.

The cameras 102, 103, and 104 convert the incident light into video data as digital data. The cameras 102, 103, and 104 may be commercially available cameras or cameras developed exclusively for the video system shown in FIG. 1. Any cameras are usable as long as they conform to the existing broadcast standard.

Further, gamma processing in line with the broadcast standard is performed on the video data output by the cameras 102, 103, and 104.

Further, video images in which the object 140 is upright is incident onto the cameras 102, 103, and 104. Accordingly, the cameras 102, 103, and 104 are set so as to be vertically inverted.

Hence, the camera 102 outputs video data 120 of the right portion of the object 140, the camera 103 outputs video data 121 of the center portion of the object 140, and the camera 104 outputs video data 122 of the left portion of the object 140.

<Bi-Splitting Prism>

Figure 3:
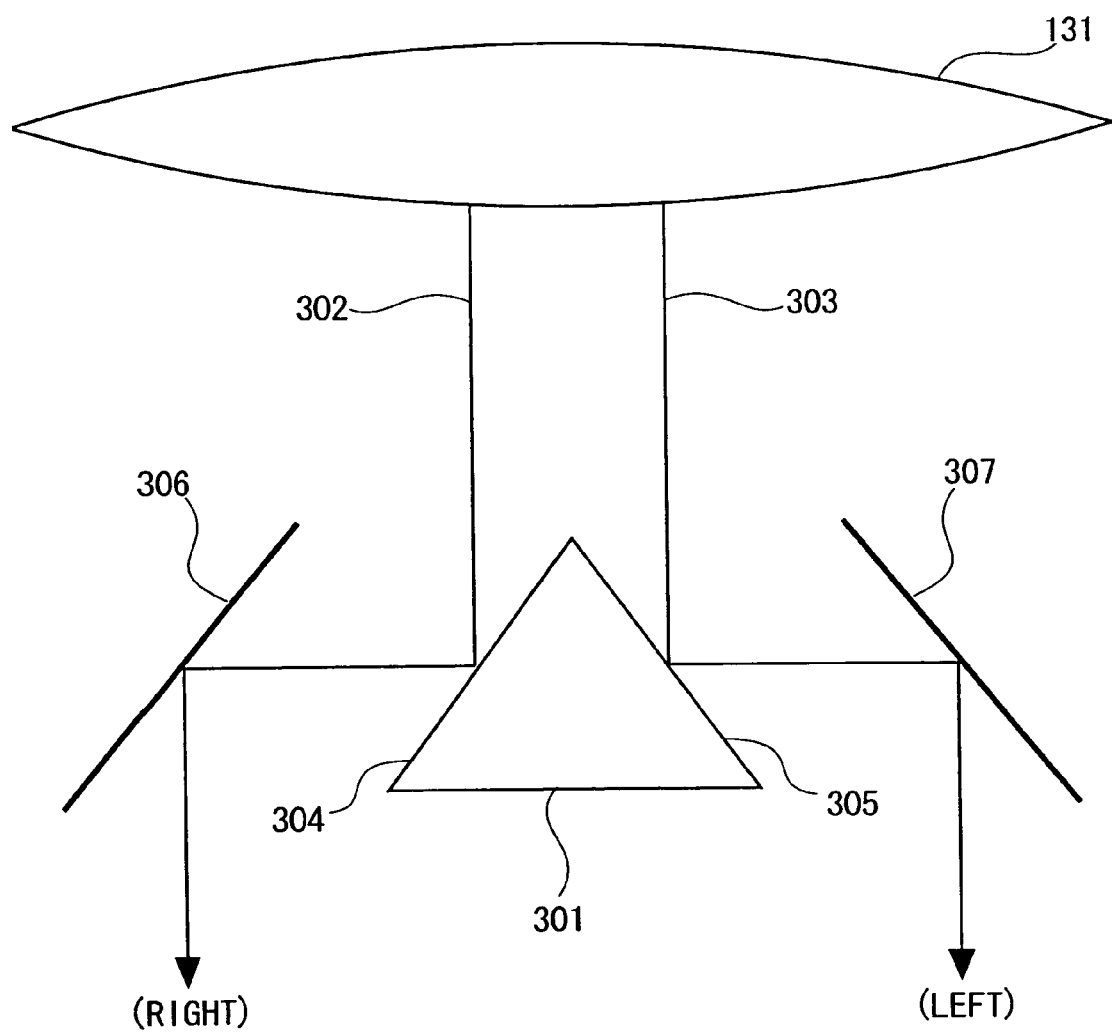
FIG. 3 is a schematic diagram of the bi-splitting prism for use in the video system shown in FIG. 1.

Next, the bi-splitting prism for use in the video system shown in FIG. 1 will be described with reference to FIG. 3, which is a schematic diagram of the bi-splitting prism for use in the video system shown in FIG. 1.

The bi-splitting prism 301 includes a reflecting surface 304 and a reflecting surface 305. As shown in FIG. 2, light 302 and light 303 from the main lens 131 are made incident onto the bi-splitting prism 301.

The light 302 output from the main lens 131 is reflected by the reflecting surface 304. The light 302 reflected by the reflecting surface 304 is reflected by the reflecting mirror 306. The light 302 reflected by the reflecting mirror 306 becomes the light for the right video image.

The light 303 output from the main lens 131 is reflected by the reflecting surface 305. The light 303 reflected by the reflecting surface 305 is reflected by the reflecting mirror 307. The light 303 reflected by the reflecting mirror 307 becomes the light for the left video image.

<Tri-Splitting Prism>

Figure 4:
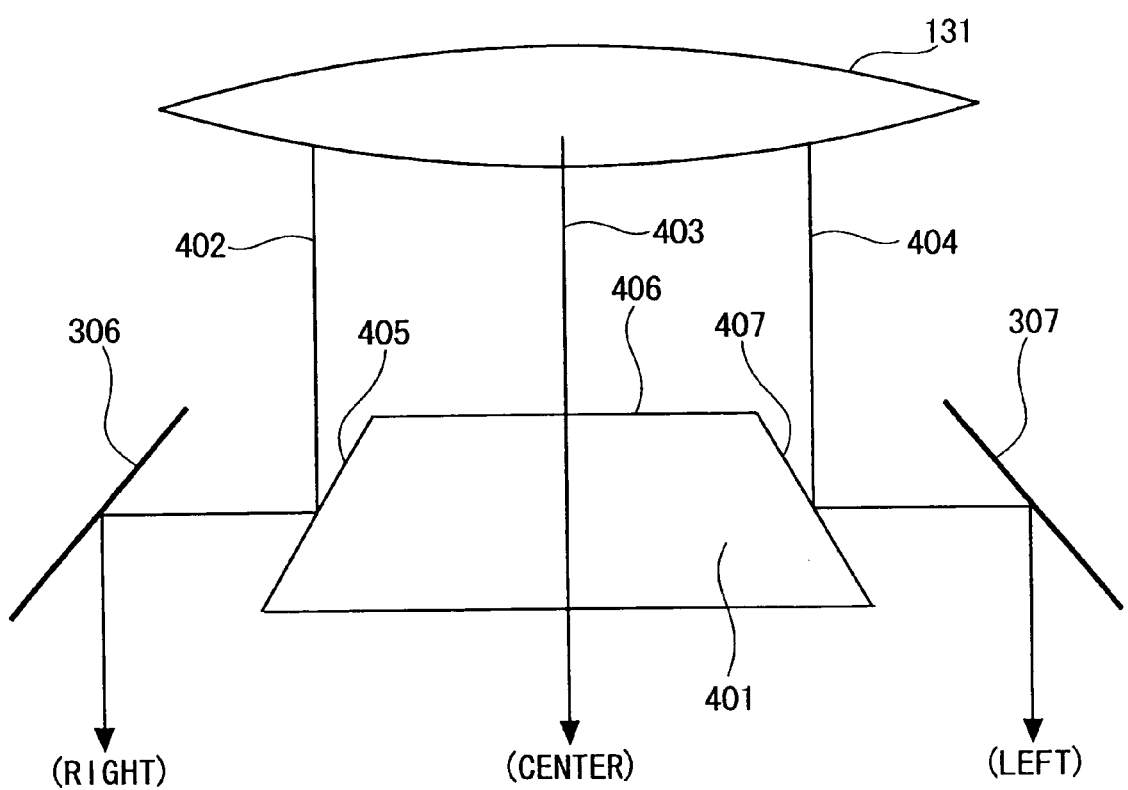
FIG. 4 is a schematic diagram of the tri-splitting prism for use in the video system shown in FIG. 1.

Next, the tri-splitting prism for use in the video system shown in FIG. 1 will be described with reference to FIG. 4. FIG. 4 is a schematic diagram of the tri-splitting prism for use in the video system shown in FIG. 1.

The tri-splitting prism 401 includes a reflecting surface 405, a transmitting surface 406, and a reflecting surface 407. As shown in FIG. 4, light 402, light 403, and light 404 from the main lens 131 are made incident onto the tri-splitting prism 401.

The light 402 output from the main lens 131 is reflected by the reflecting surface 405. The light 402 reflected by the reflecting surface 405 is reflected by the reflecting mirror 306. The light 402 reflected by the reflecting mirror 306 becomes the light for the right video image.

The light 403 output from the main lens 131 is transmitted through the transmitting surface 406. The light 403 having transmitted through the transmitting surface 406 becomes the light for the center image.

The light 404 output from the main lens 131 is reflected by the reflecting surface 407. The light 404 reflected by the reflecting surface 407 is reflected by the reflecting mirror 307. The light 404 reflected by the reflecting mirror 307 becomes the light for the left video image.

The bi-splitting prism 301 and the tri-splitting prism 401 are exchanged for each other according to needs.

<Optically Overlapped (Duplicated Overlap) Video Image Generation Processing>

The lens unit 101 shown in FIG. 1 can perform optically overlapped (duplicated overlap) video image generation. The optically overlapped (duplicated overlap) video image generation processing will be described below.

First, the splitting unit 135 includes the bi-splitting prism. Then, in the case of the bi-splitting prism, light incident onto an edge thereof is sometimes reflected to a direction other than a direction toward the camera. Because of this reflection, the light incident onto the edge portion of the bi-splitting prism is sometimes not made incident onto the camera.

Furthermore, in the lens unit 101, there is a position where the focal plane of the main lens 131 and focal planes of the relay lenses 132, 133, and 134 coincide with one another. Here, the focal planes are planes formed of the respective focal points of the main lens and the relay lenses.

When the bi-splitting prism is set at this position, undesirably, the main lens and the relay lenses are brought into focus also on the edges of the bi-splitting prism.

Accordingly, when the video image is recorded on a CCD of the camera, a portion of the light which is not made incident onto the camera is recognized as a dropout or line of the image by the camera. Therefore, the portion recognized as the dropout or the line becomes a one to several-dot dropout of the image.

Further, the splitting unit 135 includes the tri-splitting prism. In the case of forming reflecting surfaces (left and right) and a transmitting surface (center) on the tri-splitting prism, physical defects relating to formation of surface coatings in the tri-splitting prism occur on the edges thereof.

Furthermore, in the lens unit 101, there is a position where the focal plane of the main lens 131 and the focal planes of the relay lenses 132, 133, and 134 coincide with one another. When the tri-splitting prism is set at this position, undesirably, the main lens and the relay lenses are brought into focus also on the edges of the tri-splitting prism.

Accordingly, when the video image is recorded on the CCD of the camera, the defects on the edges are recognized as dropouts or lines of the video image by the camera. Therefore, the portions recognized as the dropouts or the lines become one to several-dot dropouts of the image.

In the video system shown in FIG. 1, in order to cope with such dropouts of the video image as described above, which occur in the bi-splitting prism and the tri-splitting prism, a function to shift the position of the splitting unit 135 from the focal plane position in the lens unit 101 where the focal plane of the main lens 131 and the focal planes of the relay lenses 132, 133, and 134 coincide with one another is provided. Further, this function can be made valid/invalid.

By this shift, the edges of the bi-splitting prism and the tri-splitting prism, which cause the video dropouts, turn into a state of not being brought into focus, that is, into a blurred state. Then, the physical video dropouts on the edges of the tri-splitting prism due to the formation of the surface coatings and the video dropout on the edge of the bi-splitting prism due to the reflection become out of the focus. As a result of this, it becomes impossible to visually observe these video dropouts. Specifically, these dropouts are not captured as apparent pixel dropouts (improper white balance) in the camera.

Furthermore, by this shift, diffraction of the light occurs. By this diffraction of the light, certain regions on both left and right sides of the splitting line become gradually darker (weaker), and an optically overlapped (duplicated overlap) video image is generated. The optically overlapped (duplicated overlap) video image is generated uniformly on both horizontal ends of the split video image. Generation of this overlapped (duplicated overlap) video image is referred to as optically overlapped (duplicated overlap) video image generation processing in this specification.

The overlapped (duplicated overlap) video image is also referred to as an optical overlap in the present invention. Further, the generation of the overlapped (duplicated overlap) video image is referred to as optical overlap processing. The size of this overlapped (duplicated overlap) video image is increased and decreased according to a shift amount of the splitting unit 135 from the focal plane. By use of the overlapped (duplicated overlap) video image, the video system shown in FIG. 1 performs the video processing in the image processor 105 at the latter stage. By the video processing, the video system shown in FIG. 1 can eliminate partial dropout of the video image (can make the video image seamless), which occurs by the prism edges or the bi-splitting/tri-splitting means, the dropout being the problem to be solved.

Figure 5:
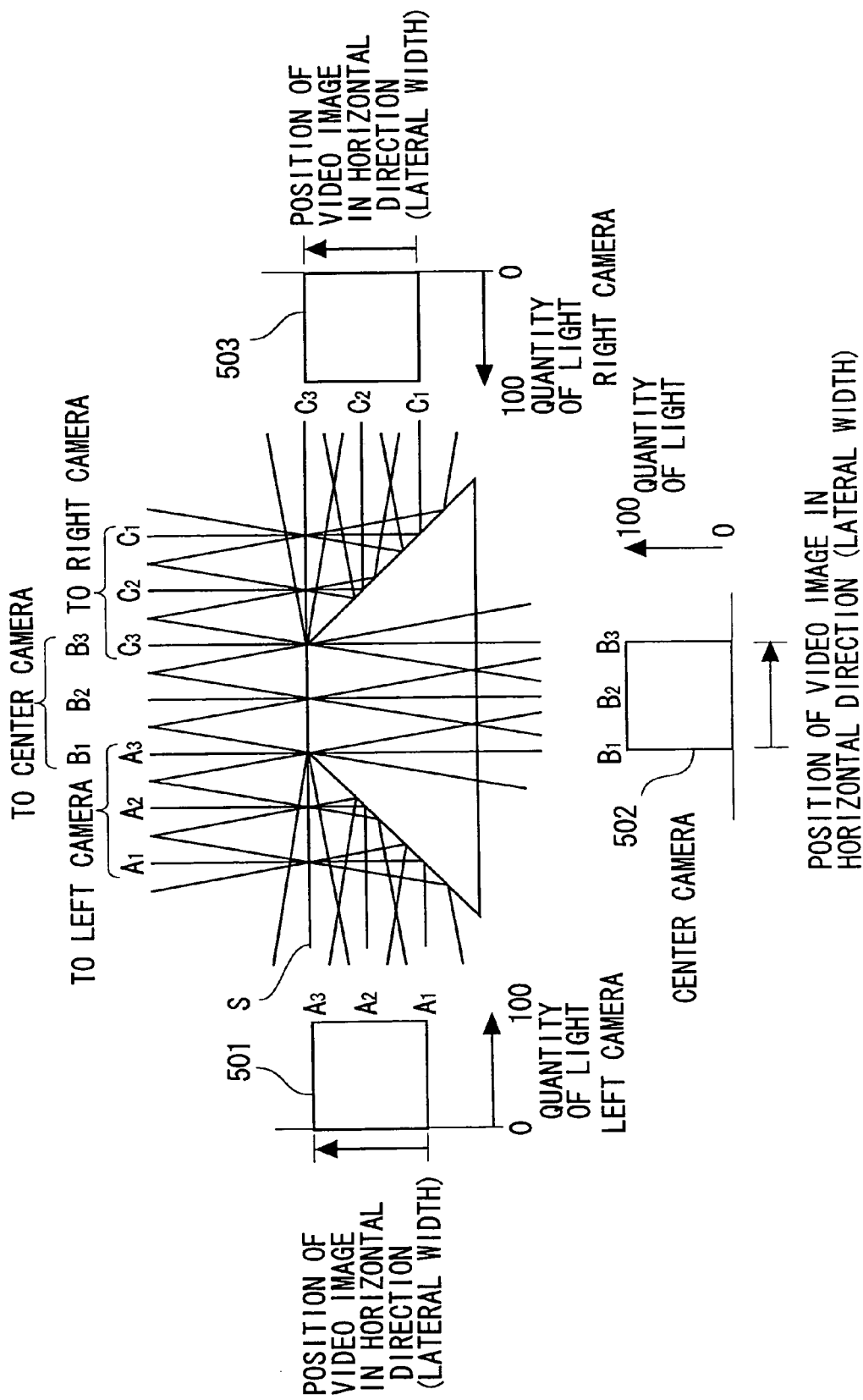
FIG. 5 is a schematic diagram showing a case where the upper surface of the tri-splitting prism is placed on the focal plane of the main lens.
Figure 6:
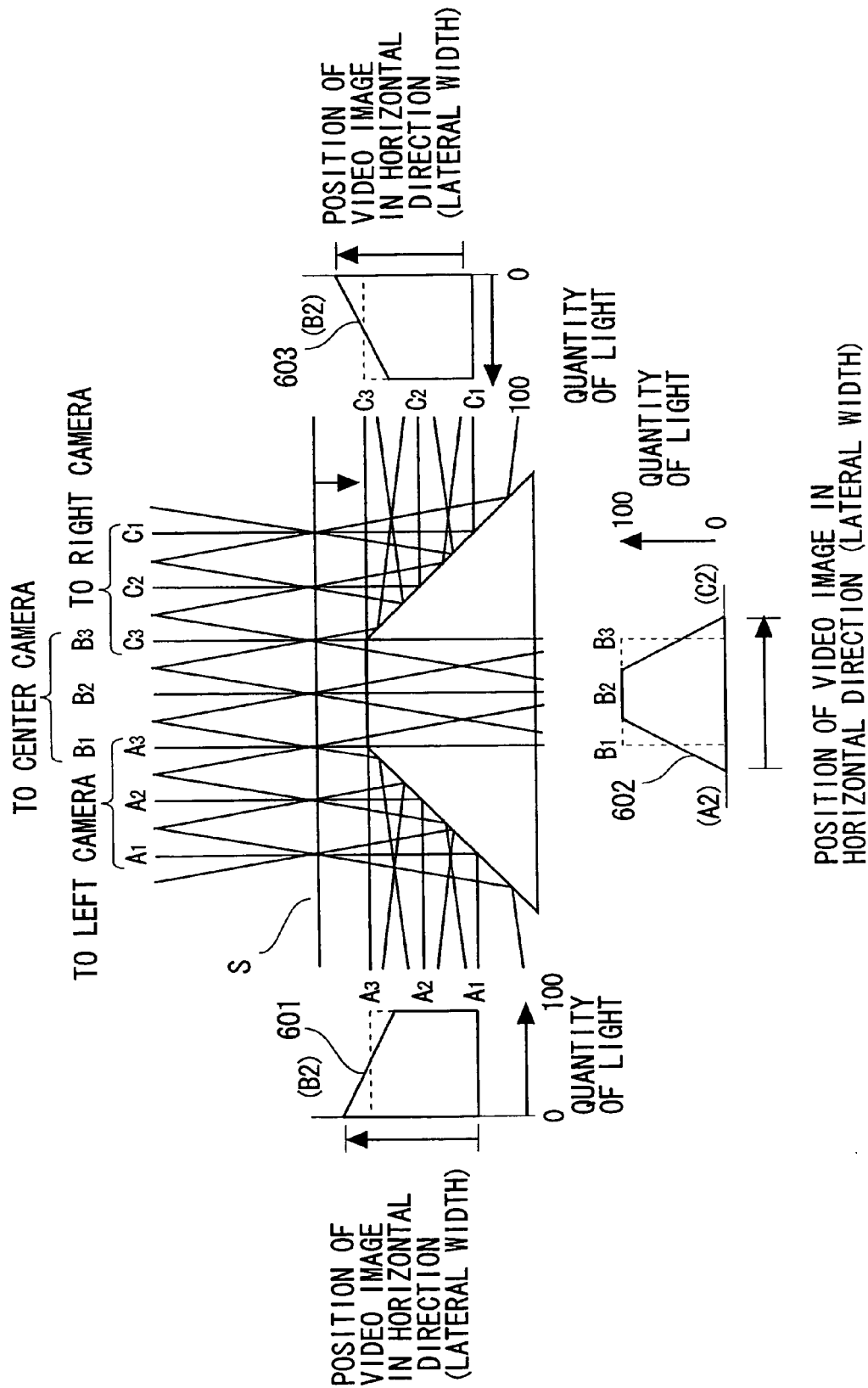
FIG. 6 is a schematic diagram showing a case where the upper surface of the tri-splitting prism is located below the focal plane of the main lens.
Figure 7:
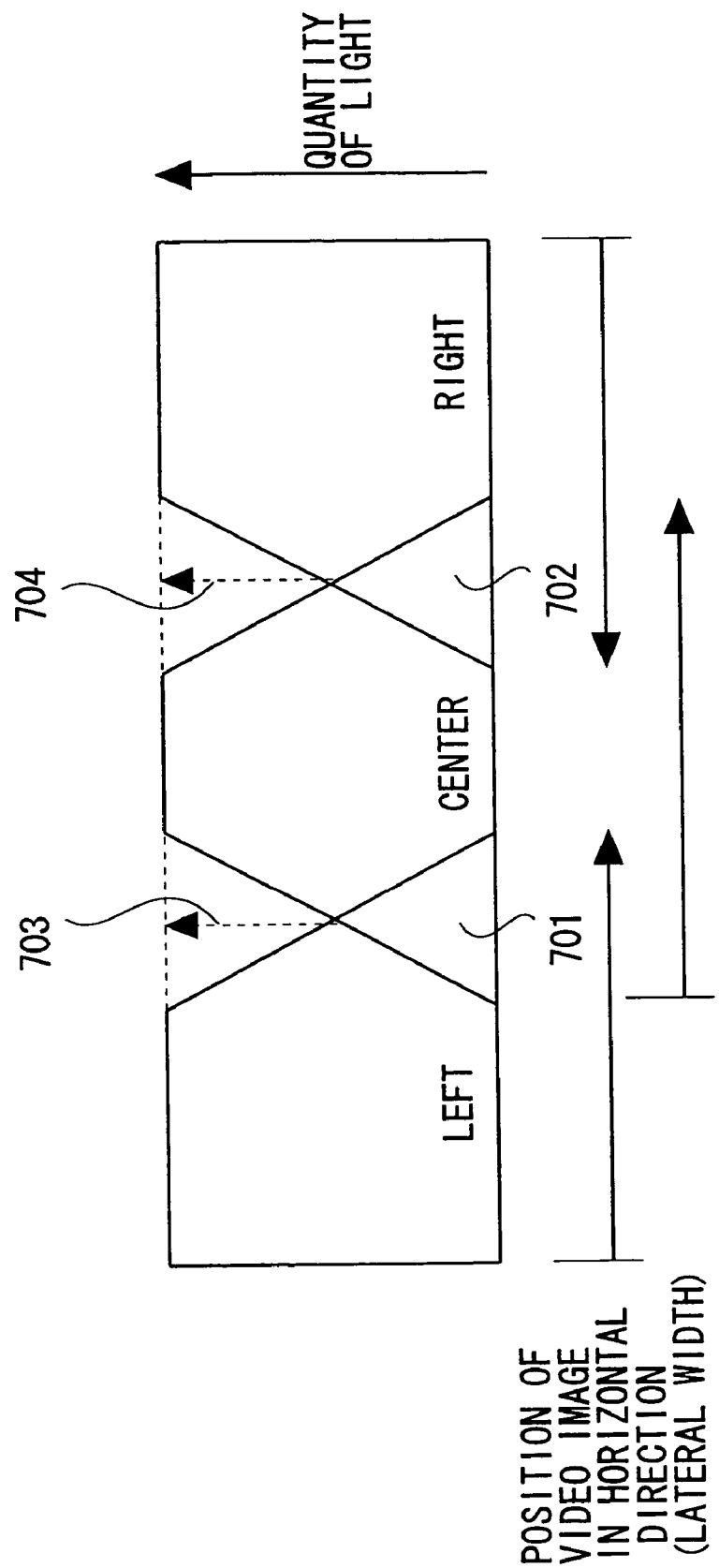
FIG. 7 is a conceptual diagram showing a state where video images incident onto the left camera, center camera, and right camera are synthesized in the case shown in FIG. 6.

This optically overlapped (duplicated overlap) video image generation processing will be described below in further detail with reference to FIGS. 5, 6 and 7. FIG. 5 is a schematic diagram when the upper surface of the tri-splitting prism is set on the focal plane of the main lens. FIG. 6 is a schematic diagram when the upper surface of the tri-splitting prism is shifted backward from the focal plane of the main lens. FIG. 7 is a conceptual diagram showing a state where video images made incident onto the left camera, the center camera and the right camera are synthesized in the case shown in FIG. 6. In the following description, the optically overlapped (duplicated overlap) video image generation processing by means of the tri-splitting prism will be described; however, even in the case of the bi-splitting prism, substantially the same description may be made.

First, as shown in graphs 501, 502 and 503 of FIG. 5, when the upper surface of the tri-splitting prism is set on the focal plane S of the main lens, quantities of light incident onto the left camera, the center camera and the right camera ideally become substantially rectangular. The case shown in FIG. 5 is a case where the optically overlapped (duplicated overlap) video image is not generated. Further, the graph 501 is a graph showing the quantity of light incident onto the left camera. Further, the graph 502 is a graph showing the quantity of light incident onto the center camera. Further, the graph 503 is a graph showing the quantity of light incident onto the right camera. Furthermore, in each of the graphs 501, 502 and 503, a direction perpendicular to an increasing direction of the quantity of light indicates a position of the video image in the horizontal direction (lateral width).

However, in the case shown in FIG. 5, the video image incident onto the center camera is not incident onto the left camera, and neither the video image of the left camera nor the video image of the right camera is incident onto the center camera. Hence, when there is a burr or the like on image splitting portions of the tri-splitting prism (portions onto which light A3 and light C3 are incident), there will be a partial lack of the video image. The tri-splitting prism is processed with so high precision that this partial lack of the video image occurs due to a mere disturbance of the transmitting/reflecting surfaces.

Next, the case shown in FIG. 6 is a case where the focal plane S of the main lens is set apart from the front surface of the tri-splitting prism. In this case, as shown in graphs 601, 602 and 603, for example, quantities of light incident onto the respective cameras are gradually decreased as ranges of the video images go toward their horizontal ends. Further, for example, as shown in graph 603, a part of the video image incident onto the center camera is also incident onto the right camera. Here, the graph 601 is a graph showing the quantity of light incident onto the left camera. Further, the graph 602 is a graph showing the quantity of light incident onto the center camera. Further, the graph 603 is a graph showing the quantity of light incident onto the right camera. Furthermore, in each of the graphs 601, 602 and 603, a direction perpendicular to an increasing direction of the quantity of light indicates a position of the video image in the horizontal direction (lateral width).

Then, when the video images of the left camera, the center camera and the right camera are synthesized in a state shown in FIG. 6, a state as shown in FIG. 7 appears. Note that, though an actual overlapped (duplicated overlap) video image is generated as a band with a uniform width, the example shown in FIG. 7 shows that this band becomes darker as it goes to the left as shown in the graph of the quantity of light. Further, in the graph shown in FIG. 7, a direction perpendicular to an increasing direction of the quantity of light indicates positions of the video images in the horizontal direction (lateral width).

As shown in FIG. 7, in the video images incident onto the respective cameras, video image portions 701 and 702 to be captured on the other cameras will be included though their quantities of light are small. When these portions are synthesized, pixels can be tightly matched, and no pixel dropout occurs. Further, in FIG. 7, synthesized portions 703 and 704 mean that adding up the portions 701 and 702 optically leads to the same quantities of light as those of portions other than the optically overlapped (duplicated overlap) video images. The above is the optically overlapped (duplicated overlap) video image generation processing in the video system shown in FIG. 1.

<Image Processor 105>

Next, the image processor 105 shown in FIG. 1 will be described. The image processor 105 generates single video data from the video data output from the cameras 102, 103, and 104.

The image processor 105 performs seamless processing for the overlapped (duplicated overlap) video image generated in the lens unit 101. The seamless processing will be described later. Then, the image processor 105 splits the generated single video data one more time according to the number of cameras, and then outputs the split data.

Note that, in the video system shown in FIG. 1, consideration is also made of the case where the processing in the image processor 105 is not required, and the processing such as the seamless processing of the image processor 105 may be set to ON or OFF. Specifically, this case is a case where the optical overlap is not attached and where the partial lack of pixels is tolerated.

<Seamless Processing>

Next, the seamless processing performed in the image processor 105 will be described. The image processor 105 performs inverse gamma processing for the received video data. The inverse gamma processing is a process which is inverse to the gamma processing performed on the video data in the cameras 102, 103, and 104. Specifically, the inverse gamma processing is processing for releasing the gamma processing performed in the cameras 102, 103, and 104 for the video data output therefrom, and returning the received video data for which the gamma processing has been performed by the cameras to the video data before the gamma processing has been performed thereon at the time of being output by the cameras.

Next, the image processor 105 synthesizes the pieces of video data of the same optically overlapped (duplicated overlap) video images, which are adjacent to each other, and on which the inverse gamma processing has been performed. Then, the image processor 105 optically adds (synthesizes) brightness of the pieces of video data to become uniform with brightness of video data which is not synthesized. The portions synthesized in such a manner are portions of the overlapped (duplicate overlap) video images generated by the optically overlapped (duplicated overlap) video image generation.

Next, the image processor performs the gamma processing for the synthesized video data, and returns the video data to the state where the gamma processing is performed thereon in a similar way to the output data of the cameras.

By the above-described processing, the image processor 105 generates video data of a one-screen ultra wide video image without noise or pixel dropout, which is the same as the video image on the main lens, on the image processor 105 on-board memory.

It is necessary to perform this processing of the image processor 105, at the time of capturing the video image, prior to the recording of the video data, the transmission or direct display of the video data. Further, the image processor 105 stores the video data in the memory with a landscape video image captured by the three cameras in the horizontal direction taken as a reference format. Note that, in the case of capturing the video images by two cameras, the image processor 105 stores, in the memory, video data captured by the two cameras in the horizontal direction.

Further, after the seamless processing, the image processor 105 splits the video data into the same number of data as the number of cameras which have captured the video data, and then outputs the split video data. Note that, the split of the data is not performed in the case of capturing a video image from one camera only.

Further, based on a switch provided in the image processor 105 or a command (processing bit) included in the video signal, for the received video data, the image processor 105 switches itself to any of processing for an "unsplit" video image, processing for video images split into two, and processing for video images split into three. The processing for performing the switching of the splitting processing for the video here based on the command (processing bit) included in the video signal will be described later.

The reason why the image processor 105 outputs the same number of video data as the number of cameras is because the output of the same number of video data as the number of cameras makes it easy to realize compatibility of the video system of this embodiment with the existing video recording system, transmission/relay system, playback/display system, and the like.

Here, description will be made regarding where the control information for allowing the image processor 105 to perform the optically overlapped (duplicated overlap) video image generation processing according to the split number of received video images is to be set on the video data output from the cameras 102, 103, and 104.

In this embodiment, control information for the video pattern to be processed is set on user data regions in HD (High-Definition)-SDI (Serial Data Interface) streams output from the cameras 102, 103, and 104. In order to give priority to compatibility with conventional video, for the video pattern to be processed, nothing is set in the case of no splitting, and for example, values of "MV2" and "MV3" are set in the case of bi-splitting and tri-splitting to enable identification. Here, such predetermined values as MV2 and MV3 are set for the purpose of preventing a malfunction of the image processor. Naturally, these values may be combinations of other characters.

In this case, the location where the synthesis is performed will be determined by use of "Material Transmission Ancillary Data (General Information)" ($574^{th}$ line) defined by "ARIB TR-B22."

ARIB stands for "Association of Radio Industries and Businesses," and "TR-B22" is a standard number thereof. However, the object of the video system shown in FIG. 1 is not limited to Hi-Vision (HDTV), and accordingly, the above-described standard is a mere example.

<Detailed Description of Image Processor 105>

Next, configuration and operation of the image processor 105 shown in FIG. 1 will be described in detail with reference to FIGS. 8 to 14. First, the configuration of the image processor 105 shown in FIG. 1 will be described with reference to FIGS. 8 to 11. FIGS. 8 to 11 are block diagrams showing the internal configuration of the image processor 105 shown in FIG. 1. Description will be made below by taking as an example the case where the video image is split into three. However, the following description can be applied in a substantially similar way even in the case where the video image is split into two and the left video data and the right video data are input to the image processor 105. Further, it may be defined that one image processor is composed of the respective blocks shown in FIGS. 8 to 11.

Figure 8:
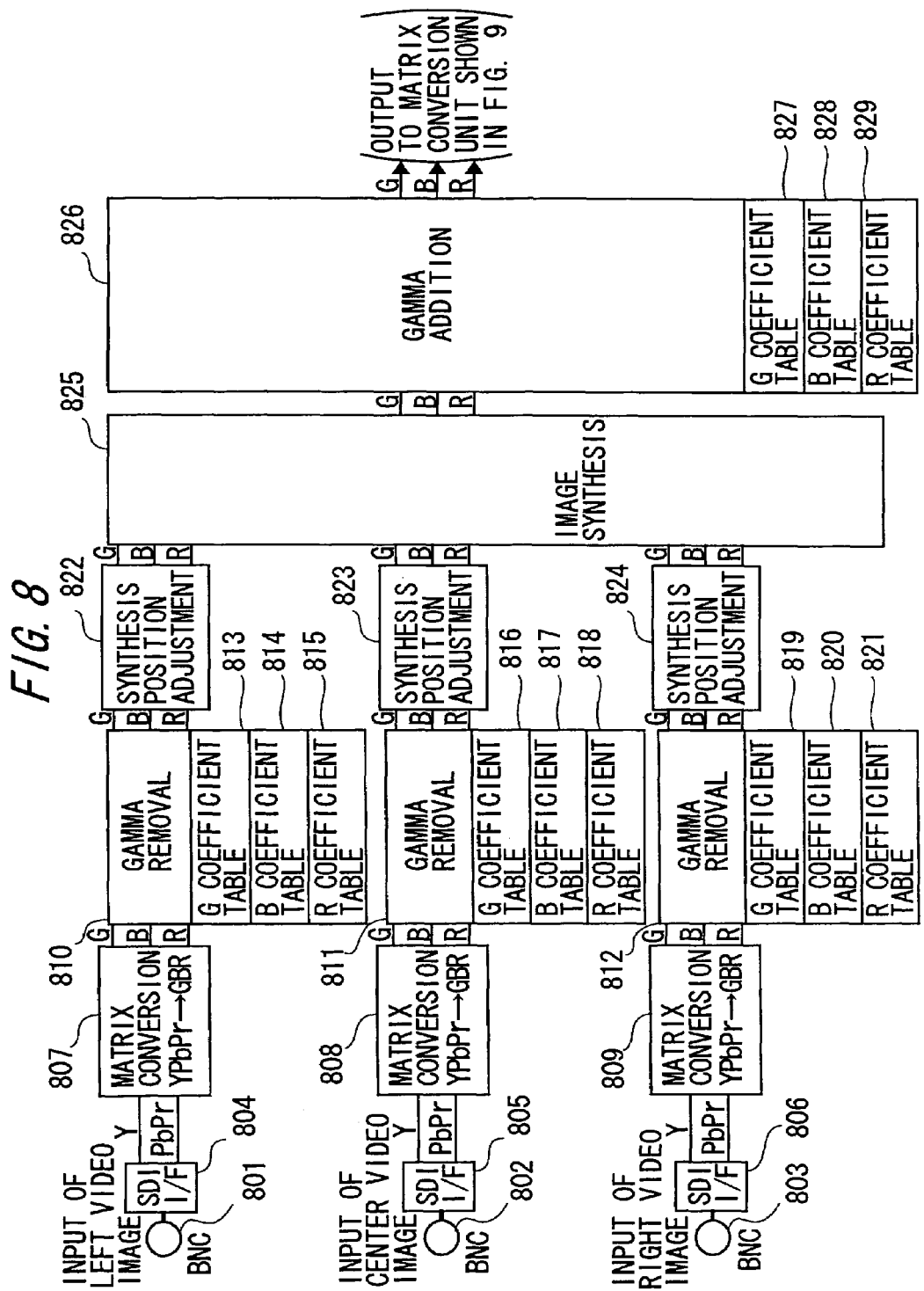
FIG. 8 is a block diagram showing the internal configuration of the image processor 105 (part 1 of 3) shown in FIG. 1.

As shown in FIG. 8, the image processor 105 includes a BNC terminal 801 to which the left video data is input, a BNC terminal 802 to which the center video data is input, and a BNC terminal 803 to which the right video data is input. Note that, though the image processor 105 shown in FIG. 8 will be described by taking as an example the case where Y, Pb, Pr (4:2:2) are input thereto, it may be defined that the image processor as the processing apparatus of the present invention is capable of coping with the case where at least any of Y, Pb, Pr (4:4:4) and G, B, R (4:4:4) are input thereto. Here, A, B, C (X:Y:Z) mean video signals in which data of A, B, C is converted into numbers in a ratio of X:Y:Z.

The left video data input to the BNC terminal 801 is input to an SDI I/F 804. The SDI I/F 804 converts a serial signal with 1.485/1.001 (here, A/B means a division of A by B, the same in the following) Gbps into parallel signals of 20 bits (Y: 10 bits; Pb/Pr: 10 bits) with a sampling frequency of 74.25/1.001 MHz. Here, Y denotes yellow, Pb denotes a blue color difference, and Pr denotes a red color difference.

The SDI I/F 804 outputs the converted parallel signals of Y and PbPr to a matrix conversion unit 807. The matrix conversion unit 807 converts the signals of Y and PbPr into green (hereinafter, abbreviated as G) signals, blue (hereinafter, abbreviated as B) signals and red (hereinafter, abbreviated as R) signals.

The center video data input to the BNC terminal 802 is input to an SDI I/F 805. The SDI I/F 805 converts a serial signal with 1.485/1.001 Gbps into parallel signals of 20 bits (Y: 10 bits; PbPr: 10 bits) with a sampling frequency of 74.25/1.001 MHz.

The SDI I/F 805 outputs the converted parallel signals of Y and PbPr to a matrix conversion unit 808. The matrix conversion unit 808 converts the signals of Y and PbPr into G signals, B signals, and R signals.

The right video data input to the BNC terminal 803 is input to an SDI I/F 806. The SDI I/F 806 converts a serial signal with 1.485/1.001 Gbps into parallel signals of 20 bits (Y: 10 bits; PbPr: 10 bits) with a sampling frequency of 74.25/1.001 MHz.

The SDI I/F 806 outputs the converted parallel signals of Y and PbPr to a matrix conversion unit 809. The matrix conversion unit 809 converts the signals of Y and PbPr into G signals, B signals, and R signals.

Specifically, in the Y—PbPr mode, according to the standard of the signals, the Y signals are sampled at the frequency of 74.25/1.001 MHz, and the PbPr signals are sampled at the frequency of 74.25/1.001×2 MHz. Therefore, in this system, it is difficult to process the video data on a per-pixel basis. Accordingly, in this embodiment, the matrix conversion units 807, 808 and 809 convert the Y and PbPr (20 bits, sampled at the frequency of 74.25/1.001 MHz) into the G, B, R (30 bits, sampled at the frequency of 74.25/1.001 MHz), and make processing blocks at the later stages easy to process on the per-pixel basis. Here, when the G, B, R (4:4:4) are input to the matrix conversion units 807, 808 and 809, the matrix conversion units 807, 808 and 809 do not perform the processing therefor, and pass the G, B, R (4:4:4) without any processing. Meanwhile, when the Y, Pb, Pr (4:4:4) are input to the matrix conversion units 807, 808 and 809, the matrix conversion units 807, 808 and 809 perform the matrix conversion for 4:4:4 therefor.

Then, signals output from the matrix conversion units 807, 808 and 809 are input to gamma removal units 810, 811, and 812, respectively.

The video image captured by the camera is subjected to arithmetic of Y=X^(1/γ) so as to look natural when viewed on a monitor television. Here, X is an input, Y is an output, and γ is a coefficient. Accordingly, in this embodiment, the following Expression (1) as inverse arithmetic of Y=X^(1/γ) is defined in a look up table (hereinafter, simply referred to as an LUT) provided in each gamma removal unit so as to make it possible to linearly synthesize two pieces of video data.

$$Y = \sqrt[\gamma]{X} \quad (1)$$

By this inverse arithmetic, in the processing for synthesizing the optically overlapped (duplicated overlap) video images, the influence of gamma addition processing performed on the video data output from the camera can be eliminated. Here, the LUT is a table set in semiconductor memory. The arithmetic processing using the LUT set in the semiconductor memory is processing for converting the signal at high speed by connecting the input signal X to an address bus and passing the output signal Y through the data bus.

Further, the signals are divided into three, which are green data, blue data and red data. Therefore, each of the gamma removal units shown in FIG. 8 has three LUTs of the same configuration.

In the example shown in FIG. 8, the gamma removal unit 810 includes a G coefficient table 813 as an LUT converting values of the received G data into values from which the gamma is removed, a B coefficient table 814 as an LUT converting values of the received B data into values from which the gamma is removed, and an R coefficient table 815 as an LUT converting values of the received R data into values from which the gamma is removed.

Further, the gamma removal unit 811 includes a G coefficient table 816 as an LUT converting values of the received G data into values from which the gamma is removed, a B coefficient table 817 as an LUT converting values of the received B data into values from which the gamma is removed, and an R coefficient table 818 as an LUT converting values of the received R data into values from which the gamma is removed.

Further, the gamma removal unit 812 includes a G coefficient table 819 as an LUT converting values of the received G data into values from which the gamma is removed, a B coefficient table 820 as an LUT converting values of the received B data into values from which the gamma is removed, and an R coefficient table 821 as an LUT converting values of the received R data into values from which the gamma is removed.

Signals output from the gamma removal units 810, 811, and 812 are input to synthesis position adjustment units 822, 823, and 824, respectively.

The synthesis position adjustment units 822, 823, and 824 adjust the positions of the video data. Specifically, the three cameras are physically fixed. However, in some cases, in the three pieces of video data from these cameras, positional shifts occur on the basis of several pixels. The synthesis position adjustment units 822, 823, and 824 correct these shifts. Therefore, the synthesis position adjustment units 822, 823, and 824 utilize FIFO memories. Specifically, the synthesis position adjustment units 822, 823, and 824 correct input/output timing to/from the FIFO memories on a per-pixel basis, and correct the positions of the three pieces of video data.

Signals output from the synthesis position adjustment units 822, 823, and 824 are input to a video synthesis unit 825. The video synthesis unit 825 simply optically adds the optically overlapped (duplicated overlap) video data from which the influences of the gamma addition processing by the cameras are eliminated. Specifically, the video synthesis unit 825 synthesizes the left video data and the center video data. Further, the video synthesis unit 825 synthesizes the right video data and the center video data. Hence, the video synthesis unit 825 has two adders. Then, signals output from the video synthesis unit 825 are input to a gamma addition unit 826.

The gamma addition unit 826 performs processing for canceling variations of the video data output from the cameras, the variations having occurred by removing the gamma addition processing from the video data output from the cameras in the synthesis processing of the optically overlapped (duplicated overlap) video images, and for returning the received video data to the original video data output from the cameras. Specifically, the gamma addition unit 826 makes an output of Y=X^(1/γ) in which the input is X and the output is Y. Here, γ is a predetermined number. This γ may have a value same as or different from γ for use in any of the gamma removal units 810, 811, and 812.

The gamma addition unit 826 includes LUTs, each giving the output of Y=X^(1/γ), for each of the G data, the B data and the R data. Specifically, as shown in FIG. 8, the gamma addition unit 826 includes a G coefficient table 827, a B coefficient table 828 and an R coefficient table 829, which are the LUTs, each giving the output of Y=X^(1/γ), for each of the G data, the B data and the R data. Then, signals output from the gamma addition unit 826 are input to matrix conversion unit 901 shown in FIG. 9.

The matrix conversion unit 901 converts the data of G, B, R (30 bits, sampled at the frequency of 74.25/1.001 MHz) into data of Y, PbPr (30 bits, sampled at the frequency of 74.25/1.001 MHz) by use of a matrix arithmetic circuit.

Here, each converted Y and PbPr signal has 30 bits. Therefore, in order to make the converted Y and PbPr signal conform with the standard, the matrix conversion unit 901 thins out the Y and PbPr signal to Y, PbPr (20 bits, sampled at the frequency of 74.25/1.001 MHz) by use of a filter. Signals output from the matrix conversion unit 901 are input to extracting position adjustment units 902, 903 and 904. Here, when the original inputs of the received G, B, R are inputs at 4:4:4, the matrix conversion unit 901 outputs the signals at a ratio of 1:1 without thinning out.

The video data input to the extracting position adjustment units 902, 903 and 904 becomes a seamless video with 5760 (1920×3)×1080 pixels. However, such a video does not exist in the present standard.

Therefore, each of the extracting position adjustment units 902, 903 and 904 splits the video into three video images, each having 1920×1080 pixels. The position adjustment here is limited to a basis of two pixels/two lines.

The reason why the position adjustment by each of the extracting position adjustment units 902, 903 and 904 is limited to the basis of two pixels/two lines is because the processing is performed for the video images by the Y and PbPr (20 bits, sampled at the frequency of 74.25/1.001 MHz). Because of this processing, the scale of the electronic circuit can be reduced.

Specifically, when the Y, Pb, Pr (4:2:2) are input to each of the extracting position adjustment units 902, 903 and 904, the extracting position adjustment units 902, 903 and 904 perform the processing on the basis of two pixels in order to simplify circuits thereof. When the Y, Pb, Pr (4:4:4) are input, it is possible for the extracting position adjustment units 902, 903 and 904 to perform the processing relatively easily on the per-pixel basis. However, in order to achieve a cost reduction by sharing the circuits with the case where the Y, Pb, Pr (4:2:2) are input, the extracting position adjustment units 902, 903 and 904 shown in FIG. 9 perform the processing on the basis of two pixels. Meanwhile, the processing on the line basis by each of the extracting position adjustment units 902, 903 and 904 differs depending on whether the scanning mode thereof is interlace or progressive. In the case of interlace scanning mode, when the video image is moved on a per-line basis, frame memory, which is very expensive, is required. In order to avoid this, the extracting position adjustment units 902, 903 and 904 perform processing on the basis of two lines. In the case of progressive scanning mode, though frame memory is not required, similar handling to the case of interlace scanning mode helps the cost reduction, and accordingly, the processing is performed on the basis of two lines. Note that a pixel is referred to as a dot. Further, the line is a unit indicating a row on a screen. Further, in this embodiment, from the viewpoint of cost, a compromise is made by performing the processing on the basis of two pixels in a ratio of 4:2:2. However, the present invention is not one limited to the processing on the basis of two pixels as described above.

Signals output from the extracting position adjustment units 902, 903 and 904 are input to SDI I/Fs 905, 906 and 907, respectively, and individually to a 3 to 1 Multiplex (3 to 1 MPX) 908.

The SDI I/F 905, 906 and 907 convert parallel signals of 20 bits (Y: 10 bits; PbPr: 10 bits) with a sampling frequency of 74.25/1.001 MHz into serial signals at 1.485/1.001 Gbps.

The 3 to 1 Multiplex (MPX) 908 selects one from three types of signals, which are the signal of the center video data, the signal of the left video data, and the signal of the right video data. In order to output this selected signal on the monitor, the selected signal is output to an SDI I/F 909.

SDI I/F 905 converts the received parallel signals of 20 bits (Y: 10 bits; PbPr: 10 bits) with a sampling frequency of 74.25/1.001 MHz into serial signals at 1.485/1.001 Gbps, and then outputs the converted serial signals.

BNC terminal 910 outputs the signal output from SDI I/F 905 as left video output 1. Further, BNC terminal 911 outputs to the tri-image viewer I/F the signal output from SDI I/F 905 as left video output 2. Here, the tri-image viewer is one block on an electronic circuit. The tri-image viewer is a circuit which squeezes three HD-SDI signals by one-third into one HD-SDI signal, while joining the squeezed signals together, resulting in one HD-SDI signal for output. The tri-image viewer is a viewer used in the case of image shooting where the entire video image of three cameras is to be viewed on one screen. This tri-image viewer is composed of one board separate from the image processor. As an option, the tri-image viewer can be used by being inserted into an expansion slot of a casing of the image processor. Here, an electronic circuit which sends the video signals to the tri-image viewer board when the tri-image viewer board is inserted into the expansion slot is referred to as the tri-image viewer interface (I/F).

BNC terminal 912 outputs the signal output from SDI I/F 906 as center video output 1. Further, BNC terminal 913 outputs to the tri-image viewer I/F the signal output from SDI I/F 906 as center video output 2.

BNC terminal 914 outputs the signal output from SDI I/F 907 as right video output 1. Further, BNC terminal 915 outputs to the tri-image viewer I/F the signal output from SDI I/F 907 as right video output 2.

BNC terminal 916 outputs the signal output from SDI I/F 909 as a monitor output.

Figure 10:
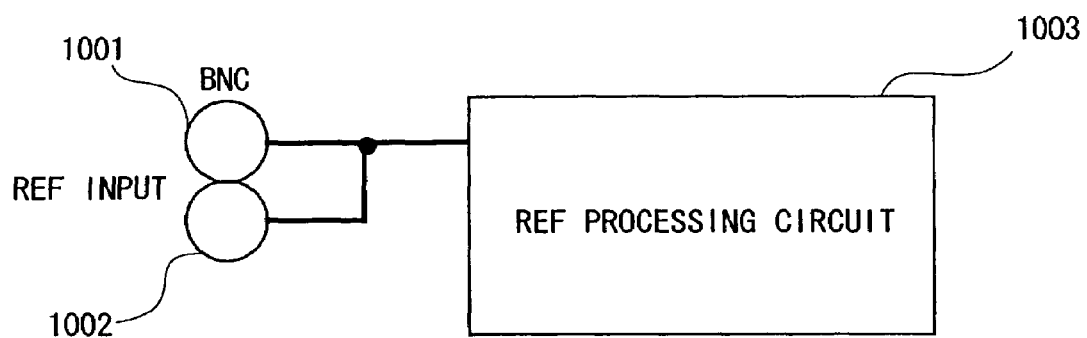
FIG. 10 is a block diagram showing the internal configuration of the image processor 105 (part 2 of 3) shown in FIG. 1.

Meanwhile, as shown in FIG. 10, a REF processing circuit 1003 is connected to a BNC terminal 1001 and a BNC terminal 1002. The REF processing circuit 1003 is a block which adjusts the timing of the entire image processor 105.

In the image processor 105, the respective blocks perform the respective processing. The REF processing circuit 1003 adjusts the processing of the respective blocks of the image processor 105, and outputs the video at target timing. Specifically, when an REF signal serving as a reference is input from outside to the REF processing circuit 1003, the REF processing circuit 1003 adjusts the timing in the inside of the image processor 105 in synchronization with the REF signal in order to perform the video output. The REF circuit 1003 is connected as a timing controller for the entire image processor 105, and accordingly, the connection relationship thereof differs for each of the respective blocks shown in FIGS. 8 and 9.

Figure 9:
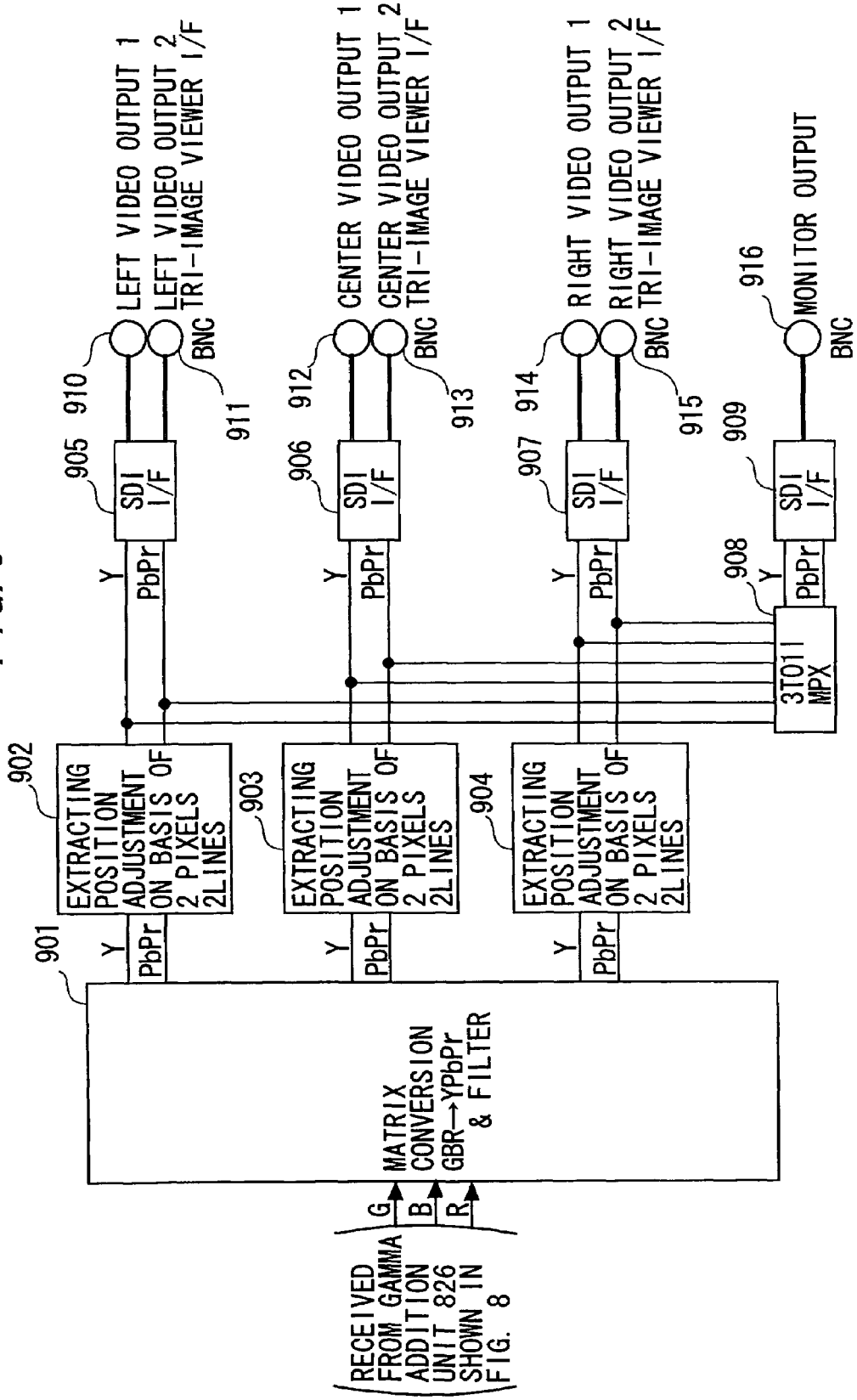
FIG. 9 is a block diagram showing the internal configuration of the image processor 105 (part 1 of 3 continued from FIG. 8) shown in FIG. 1.
Figure 11:
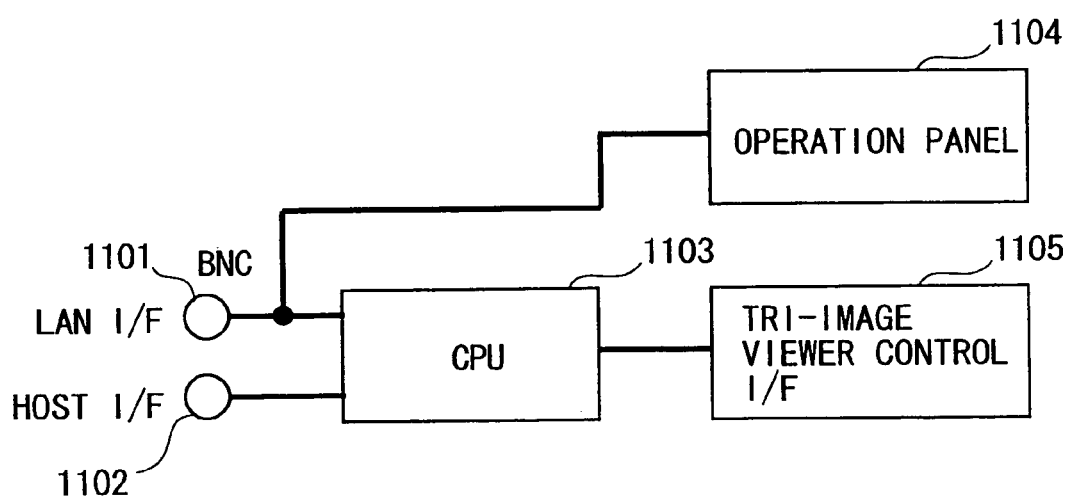
FIG. 11 is a block diagram showing the internal configuration of the image processor 105 (part 3 of 3) shown in FIG. 1.

Next, referring to FIG. 11, the control unit of the image processor shown in FIGS. 8 and 9 will be described. As shown in FIG. 11, the image processor shown in FIGS. 8 and 9 includes a CPU 1103, an operation panel 1104, and a tri-image viewer control I/F 1105. The CPU 1103 shown in FIG. 11 is connected to the respective blocks shown in FIGS. 8 and 9 through a control bus and a data bus.

CPU 1103 controls the operation of the image processor 105 in cooperation with a program stored in the memory (not illustrated). CPU 1103 is connected to a BNC terminal 1101 as a LAN I/F and a BNC terminal 1102 as a host I/F. Further, CPU 1103 is connected to the operation panel 1104. Further, the CPU 1103 is connected to the tri-image viewer control I/F 1105. Further, the operation panel 1104 is connected to the BNC terminal 1101.

In cooperation with the program stored in memory (not illustrated), CPU 1103 performs an operation of switching the processing in the image processor 105 based on any command of a command of processing corresponding to a tri-split video, a command of processing corresponding to a bi-split video, a command of processing corresponding to an "unsplit" video, and a command to the effect that processing is to be performed based on data imparted to the received video data, which are input from the operation panel 1104.

<Gamma Value Adjustment Operation>

Figure 12B:
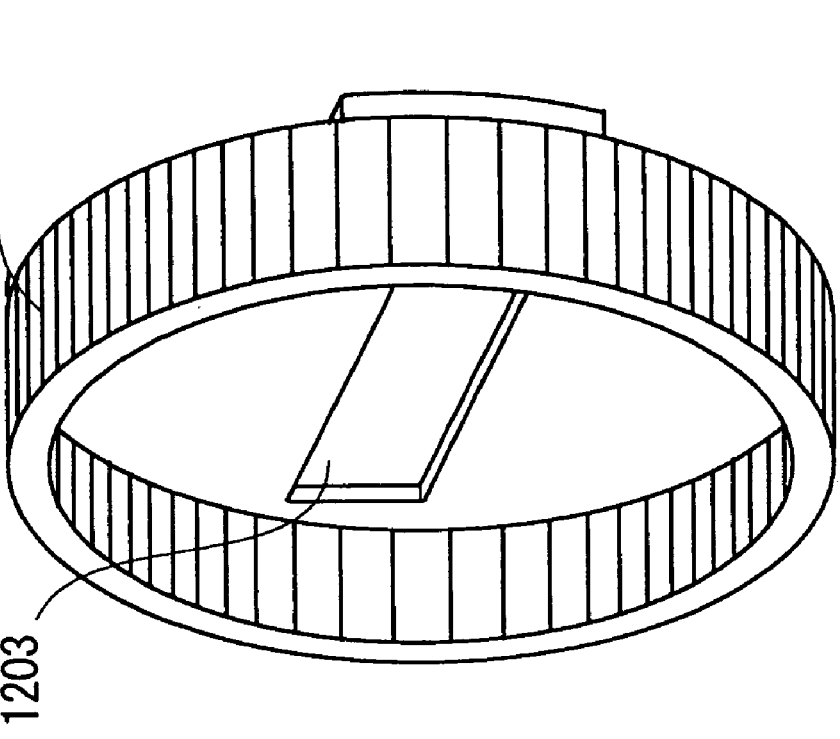
FIG. 12B is a schematic diagram of a lens cap for obtaining incident light for correcting gamma value in the image processor 105 shown in FIG. 1.
Figure 12A:
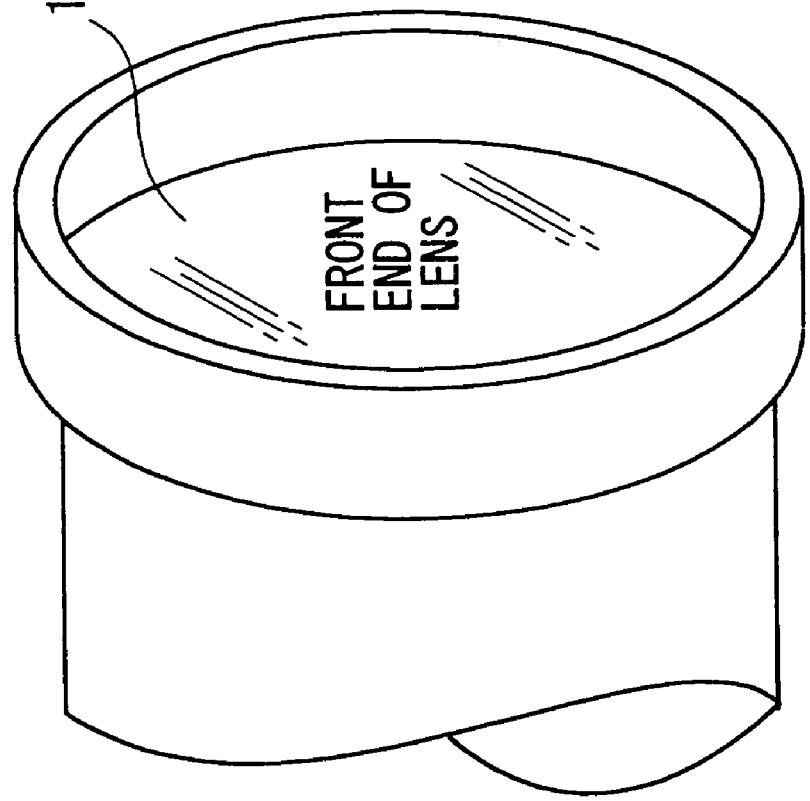
FIG. 12A is a schematic diagram of a lens cap for obtaining incident light for correcting gamma value in the image processor 105 shown in FIG. 1.

Next, the gamma value adjustment operation by the image processor 105 shown in FIGS. 8 and 9 will be described. First, referring to FIG. 12A, FIG. 12B, FIG. 13A and FIG. 13B, a mechanism of giving the cameras a uniform video for performing automatic gamma adjustment in the image processor 105 shown in FIGS. 8 and 9 will be described, but this is just one embodiment of the present invention and not limited to this embodiment. FIG. 12A and FIG. 12B are schematic views of a lens cap for obtaining incident light for correcting the gamma value in the image processor 105 shown in FIG. 1, FIG. 13A is a cross-sectional view of the lens cap shown in FIG. 12B, and FIG. 14 is a flowchart of the operation of the image processor 105 shown in FIG. 1.

As shown in FIG. 12A and FIG. 12B, in the video system shown in FIG. 1, a lens cap 1202 is attached onto the front end 1201 of the main lens. This lens cap 1202 includes a light emitting portion 1203 which emits white light in the inside thereof.

This light emitting portion 1203 is formed by providing a slit in the lens cap 1202 and providing a white-light emitting plate to be described later in the lens cap 1202 from the back of this slit.

Figure 13A:
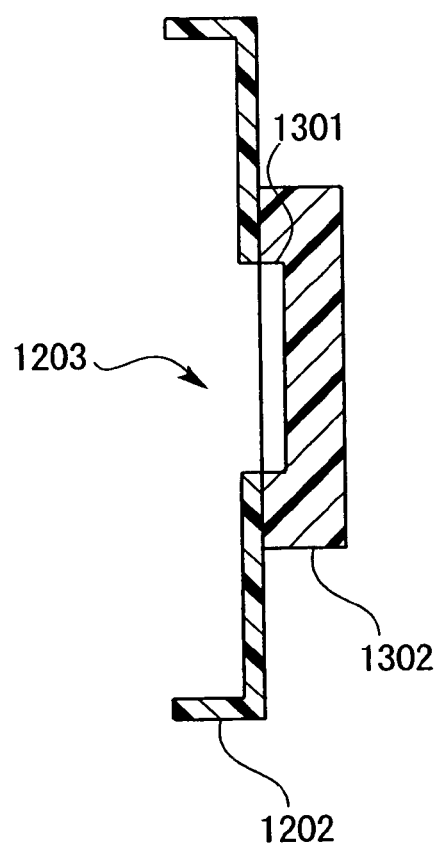
FIG. 13A is a sectional view of the lens cap shown in FIG. 12B.
Figure 13B:
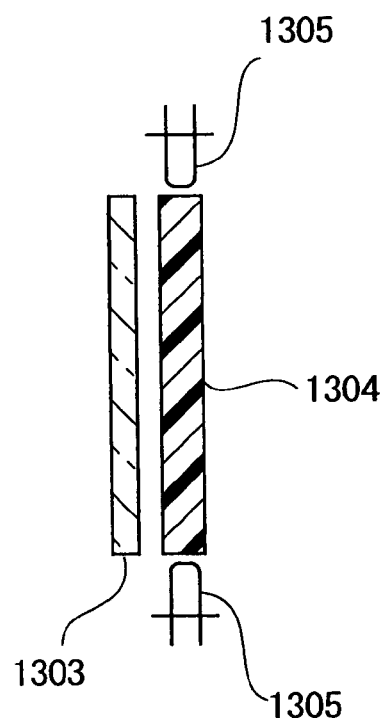
FIG. 13B is a diagram showing a configuration of the white-light emitting plate 1301 shown in FIG. 13A.
Figure 14:
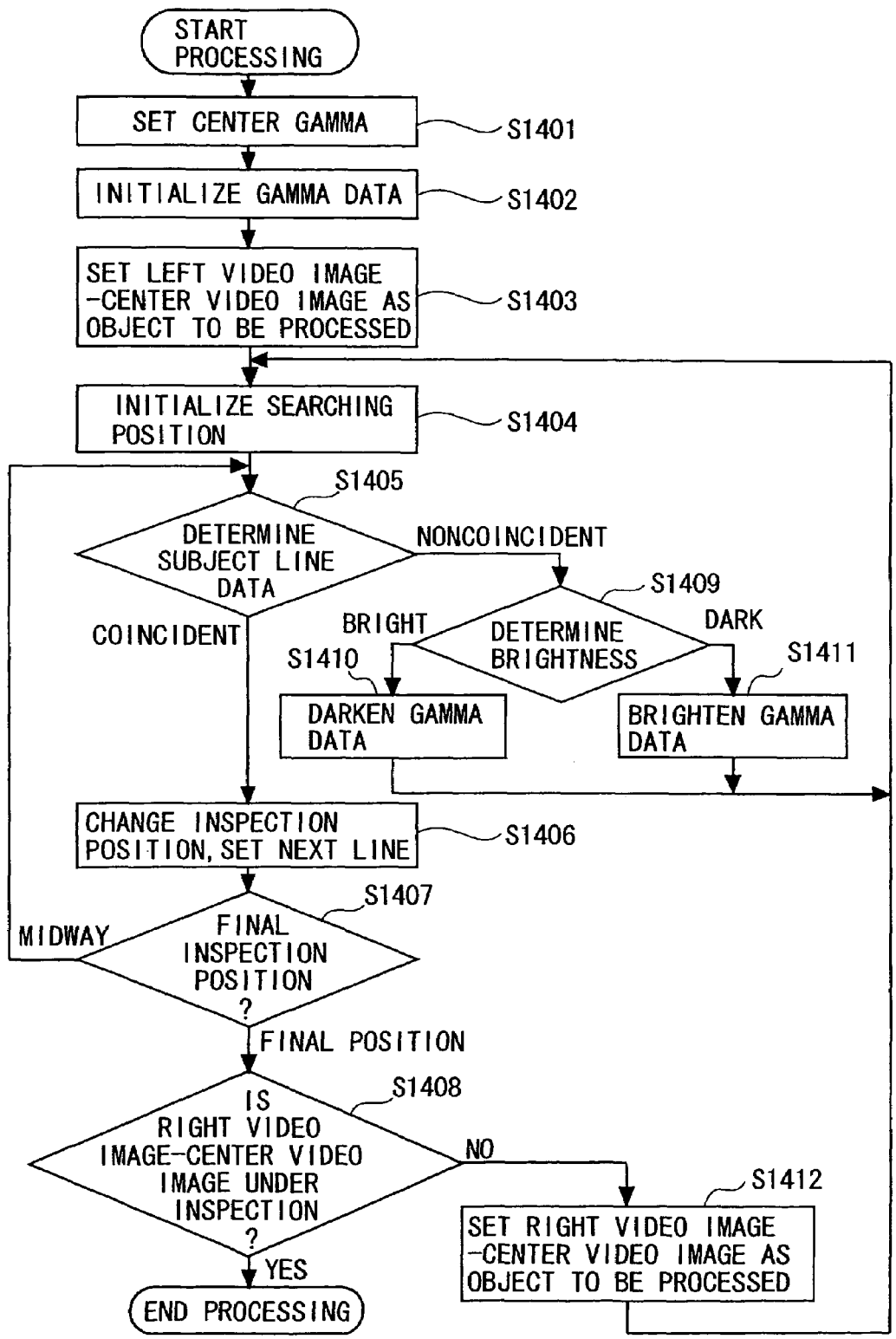
FIG. 14 is a flowchart of an operation of the image processor 105 shown in FIG. 1.

Further, as shown in FIG. 13A, the light emitting portion 1203 which emits white light is composed of a white-light emitting plate 1301 and a case 1302 which covers this plate. Further, as shown in FIG. 13B, the white-light emitting plate 1301 includes a milk-white colored translucent glass plate 1303, a diffusion plate 1304, and numerous of white LEDs 1305. Here, FIG. 13B is a view showing a configuration of the white-light emitting plate 1301 shown in FIG. 13A.

The diffusion plate 1304 diffuses incident light uniformly on the entire surface thereof, and emits the diffused light. Instead of this diffusion plate 1304, a light guide plate used in a liquid crystal display or the like may be used. The numerous of, for example, eight to sixteen white LEDs 1305 are provided so as to surround the diffusion plate 1304. For a power source of these white LEDs 1305, a battery is usable, and an external power source is also usable. This battery is housed in the case 1302. Here, the reason why the numerous white LEDs 1305 are not set on the right-hand side of diffusion plate 1304 in FIG. 13B but attached in the periphery of the diffusion plate 1304 is to make the structure of the lens cap 1202 thin to achieve the uniformity of light quantity in the case of using the diffusion plate 1304. Further, when the white-light emitting plate 1301 and the case 1302 are attached on the inside of the lens cap 1202, the depth of the lens cap 1202 increases, and there is a fear that the light emitting portion 1203 may come into contact with the lens and damage the lens.

Due to such a structure as shown in FIG. 12A, FIG. 12B, FIG. 13A and FIG. 13B, the light from the white-light emitting plate 1301 is made incident onto the main lens. The image processor of this embodiment corrects the LUTs for removing the gamma processing with respect to the difference in gamma value among the respective cameras.

Next, the gamma value adjustment operation in the image processor 105 shown in FIGS. 8 and 9 will be described with reference to FIG. 14. Processing shown in FIG. 14 is a process which the CPU 1103 shown in FIG. 11 performs in cooperation with the program stored in memory (not illustrated). Further, the processing shown in FIG. 14 becomes an operation of one embodiment of the computer program for adjusting gamma value of the present invention when using tri-splitting prism. Further, when the following gamma value adjustment operation is performed, the light from the above-described plate 1301 shown in FIG. 13 is incident onto the main lens.

Description will be made below for the case of capturing a three-screen video image in the video system shown in FIG. 1. As shown in FIG. 14, first, the CPU 1103 sets the gamma value of the center camera (S1401). In this step, the CPU 1103 receives an input of the gamma value from the operation panel 1104. Because the gamma value of the camera has been set, this is performed in order to take this value as a reference. Specifically, the CPU 1103 allows a value corresponding to the gamma value of the camera to be input.

Next, the CPU 1103 initializes gamma data (S1402). Specifically, the CPU 1103 sets the gamma value of the LUT for the gamma removal performed for the center video data according to the input value. Further, the CPU 1103 sets gamma values of the LUTs for the gamma removal performed for the left video data and the right video data as reference values. Here, for example, 1.0 can be selected for these reference values. This setting allows the input and output of the table to become the same value. As described above, the setting of the gamma values means setting of the gamma values of the respective gamma removal tables of the gamma removal units 810, 811, and 812 shown in FIG. 8.

Next, the CPU 1103 sets the portion of the video data in which the left video data and the center video data are synthesized together (described also as a left video image-center video image) as an object to be processed (S1403).

Next, the CPU 1103 initializes the inspection position of the left video image-center video image (S1404). Specifically, the CPU 1103 sets the synthesized position of the optically overlapped (duplicated overlap) video images, and initializes internal variables for performing the inspection from this position.

Here, the reason why the CPU 1103 inspects multiple lines in the flowchart shown in FIG. 14 will be described. The processing in the image processor is digital. However, values obtained as a result of capturing a video image incident through the lens are analog like values. Therefore, it is expected that the resulting values are distributed over some range. Accordingly, in the inspection according to this embodiment, not only one point on the screen is inspected, but the entire video image is inspected from the upper portion to the lower portion thereof. Then, in this embodiment, it is necessary for the CPU 1103 to select the optimum gamma value as a result of the inspection. Therefore, the CPU 1103 inspects multiple lines.

Next, the CPU 1103 determines the subject line data (S1405). Specifically, the CPU 1103 inspects whether or not a subject line is "flat" in the lateral direction. In this step, the CPU 1103 determines whether or not the brightness of the portion in which the optically overlapped (duplicated overlap) video images are synthesized together is within a predetermined range. It is expected that the determination varies among the upper portion, center portion, and lower portion of the screen, and accordingly, this determination is performed on a per-line basis. Specifically, the CPU 1103 performs the inspection for each predetermined line, selects a gamma value unproblematic for the entire screen, and sets the selected gamma value as the sole one. Specifically, the CPU 1103 selects and uses the selected gamma value.

Here, description will be made on the inspection performed to determine whether or not the subject line is "flat" in the lateral direction. "Being flat" refers to a state where upsurge or downfall of the gamma value due to the synthesis is not present in the portion of the optically overlapped (duplicated overlap) video images when the video for evaluation and adjustment used for the inspection, which is output from the light emitting portion 1203 shown in FIGS. 12 and 13, is, for example, all white. Specifically, the CPU 1103 determines that the line under the inspection is "not flat" when the line has at least one pixel with brightness out of a predetermined brightness range. When the line is in this "not flat" state, the line data is determined to be noncoincident.

Next, the CPU 1103 proceeds to S1409 in the case of noncoincidence in the subject line data determination processing. In S1409, the CPU 1103 determines the brightness of the line. Specifically, in this step, the CPU 1103 determines whether the subject line is shifted to a brighter direction or a darker direction when the line is "not flat".

In S1409, the CPU 1103 reads N pieces of data on a per-pixel basis in the lateral direction. A range for which the N pieces of data are read on a per-pixel basis in the lateral direction includes the portion of the synthesized, optically overlapped (duplicated overlap) video images and a portion not corresponding to the optically overlapped (duplicated overlap) video images. Then, among the read data, the CPU 1103 counts the number of data with the same value. Then, the CPU 1103 defines the data present in the largest number as X. When more than a predetermined number of data which are other than this data and which are brighter than X are present, the line is determined to be bright. When there are present more than a predetermined number of data darker than X, the line is determined to be dark.

Then, when the line is determined to be bright in the brightness determination processing of S1409, the CPU 1103 changes the gamma value in the gamma removal table so as to darken the video, and rewrites the gamma removal table (S1410). Meanwhile, when the line is determined to be dark in the brightness determination processing of S1409, the CPU 1103 changes the gamma value so as to brighten the video, and rewrites the gamma removal table (S1411).

Here, as a principle, the CPU 1103 does not change the gamma value of the gamma removal table for the video data from the center camera, but changes the gamma value of the gamma removal table for the left video data or the right video data, thus performing the adjustment. However, when the adjustment for a adjustment range (for example, ±5.0) of the gamma value of the left video data or the right video data is insufficient, the CPU 1103 also corrects the gamma value of the removal table for the video data from the center camera.

Next, when the determination regarding the subject line data in S1405 indicates coincidence, the process proceeds to S1406. In S1406, the CPU 1103 changes the inspection position, thus setting a NEXT line. Here, the NEXT line refers to a line spaced from the previous line at some interval. This interval ranges from 1 to n.

Next, the CPU 1103 determines whether the current line is at the final inspection position (S1407). When the line is at a midway position, the CPU 1103 returns to S1405, and when the line is at the final inspection position, the process proceeds to S1408.

In S1408, the CPU 1103 determines whether the right video image-center video image is under inspection. When the video image is under inspection, the CPU 1103 terminates the processing, and when the video image is not under inspection, the process proceeds to S1412. Specifically, it is two sets, which are the left video image-center video image and the right video image-center video image, that are inspected by the CPU 1103. Accordingly, when the final inspection position has already been inspected during the inspection of the right video image-center video image, it is conceived that there is no more object to be inspected, and therefore the processing is to be terminated. On the contrary, when the right video image-center video image is not under inspection, it is determined that the inspection of the right video image-center video image still remains undone. In S1412, the CPU 1103 sets the right video image-center video image as an object to be processed, and thereafter the process proceeds to S1404. Note that the above description specifically describes the case of capturing a three-screen wide video with the tri-splitting prism. In the case of capturing a two-screen wide video with the bi-splitting prism, the inspection of the CPU 1103 is terminated only when inspection of the video data of one set, for example, the right video image-left video image, is complete.

<Image Processor 106>

Next, operation of the image processor 106 will be described. In order to reproduce the video image captured by the lens unit 101 on a large screen as it is, it is necessary to consider compatibility with the existing display system. Of existing display systems, a typical display system is a projector. In the video system shown in FIG. 1, as an example, three pieces of video data are stitched together in the lateral direction, and are displayed.

Therefore, the video system shown in FIG. 1 uses three projectors as display devices. Further, in the case of splitting a video into two in capturing the video, two projectors are used as the display devices. Further, in the case of using only one of the video images split into three, one projector is used as the display device.

Meanwhile, in the case of stitching together video images by using two or three projectors, in some cases, a completely seamless video cannot be reproduced. This is due to geometrical distortions of individual projection lenses of the two or three projectors and a difference in tone, brightness, electrical characteristics, and the like among the instruments.

When the two or three video images are simply joined together without solving these problems, a gap or a duplicated portion occurs in the seam, or the two or three video images will have tones clearly different from one another. Accordingly, the video images can hardly be recognized as one seamless video.

Accordingly, in the video system in which the image capturing device of this embodiment is used, in order to avoid these problems, electrically overlapped (duplicated overlap) video image generation processing for seam processing is performed in the image processor 106.

This electrically overlapped (duplicated overlap) video image generation processing is processing which generates the duplicated portion of the video image data by imparting the video image data for the overlapped portion of one of the adjacent images to the overlapped portion of the other video data.

The portion of the duplicated video imparted by this electrically overlapped (duplicated overlap) video image generation processing is projected while being synthesized by the projectors.

The quantity of light of the portion projected while being synthesized by the projectors will be doubled. Therefore, in this embodiment, the image processor 106 performs cross-fade processing for reducing the quantity of light with respect to the quantity of light of the portion in which the quantity of light is doubled. Thus, the image processor 106 adjusts the quantity of light, thus obtaining uniform brightness. By this processing, in this embodiment, preprocessing to display a smooth and seamless video image is realized.

The above-described electrically overlapped (duplicated overlap) video image generation processing and cross-fade processing are performed for improving screening quality of the seam upon display for the purpose of adapting to the display device used. Therefore, in some cases, even if the electrically overlapped (duplicated overlap) video image is not imparted, a seamless display can be properly made by joining and displaying the received video images for correct display.

As described above, in some cases, it is not necessary to perform the electrically overlapped (duplicated overlap) video image generation processing and the cross-fade processing. Therefore, in the video system shown in FIG. 1, the image processor 106 makes it possible to turn ON or OFF the above-described electrically overlapped (duplicated overlap) video image generation processing and cross-fade processing.

Here, description will be made regarding where the control information with which the image processor 106 performs the electrically overlapped (duplicated overlap) video image generation processing according to a received video pattern is to be set on the video data output from the cameras 102, 103, and 104.

Based on a switch provided in the image processor 106 or a command (processing bit) included in the video signal, for the received video, the image processor 106 switches whether to perform processing for an "unsplit" video image, to perform processing for video images split into two, or to perform processing for video images split into three. Here, based on the command (processing bit) included in the video signal, the image processor 106 performs the switching of the splitting processing for the video.

In a way similar to the case of the above-mentioned image processor 105, in this embodiment, the image processor 106 sets control information for the video pattern to be processed on user data regions in the HD-SDI streams output from the cameras 102, 103, and 104, (In order to give priority to compatibility with conventional video, nothing is set in the case of no splitting, and for example, values of "MV2" and "MV3" are set in the case of bi-splitting and tri-splitting to enable identification). Here, such predetermined values as MV2 and MV3 are set is for the purpose of preventing a malfunction of the image processor. Naturally, these values may be combinations of other characters.

In this case, the location where the setting is performed will be determined by use of "Material Transmission Ancillary Data (Generalized Information)" ($574^{th}$ line) defined by "ARIB TR-B22." ARIB refers to "Association of Radio Industries and Businesses," and "TR-B22" is a standard number thereof.

However, the object of the video system shown in FIG. 1 is not limited to Hi-Vision (HDTV), and accordingly, the above-described standard is a mere example.

<Recording/Playback System 110>

Next, the recording/playback system 110 shown in FIG. 1 will be described. The recording/playback system 110 records a video on video channels of which number corresponds to the number of cameras, which is output from the image processor 105. Further, the recording/playback system 110 plays back the recorded video. The recording/playback system 110 includes, for example, a tape, an HDD, and the like as constituent components.

<Relay/Transmission Network 111>

Next, the relay/transmission network 111 will be described. The relay/transmission network 111 relays and transmits the video output from the image processor 105 or the recording/playback system 110 to a network.

<Display Systems 107, 108, 109>

Next, the display systems 107, 108, and 109 shown in FIG. 1 will be described. The display systems 107, 108, and 109 are composed, for example, of projectors. Naturally, the display systems 107, 108, and 109 usable in the present invention are not limited to projectors, and other display systems can also be used. These display systems are usable as long as they are commercially available display systems or dedicated display systems and conform to broadcast or PC standards.

The display systems 107, 108, and 109 display video images based on the video data output from the image processor 105, the video data output from the recording/playback system 110, and the video data output through the relay/transmission network 111. As mentioned above, when the electrically overlapped (duplicated overlap) video images are imparted to the received video data, the display systems 107, 108, and 109 synthesize the portions of the electrically overlapped (duplicated overlap) video images, and display the video images.

<Effects of this Embodiment>

As described above, in the image processor 105 of this embodiment, in the case of synthesizing the portions of the optically overlapped (duplicated overlap) video images of the split video data, the gamma removal units 810, 811, and 812 remove the gamma processing imparted to the video data by the cameras by use of the LUTs for the purpose of the synthesis processing.

Then, in the image processor 105 of this embodiment, the image synthesis unit 825 synthesizes the video data, making the seams uniform and thus invisible.

Then, the image processor 105 of this embodiment appropriately performs the gamma processing one more time on the synthesized video data. By such processing, the image processor 105 of this embodiment can reproduce, in the form of digital data in the same state as that output from the cameras, a one-screen landscape video completely the same as the optical image of the main lens which is free from any pixel dropout or the like occurring by, for example, splitting the image by the prism.

Further, in the image processor 105 of this embodiment, the gamma addition unit 826 adds the gamma values collectively to the completely stitched one-screen video data obtained after the synthesis of the optically overlapped (duplicated overlap) video images. Therefore, in the video data output from the image processor of this embodiment, the gamma values of the one-screen landscape video data of video images captured by two or three cameras also become uniform, and the brightness of the one-screen landscape video data of video images captured by two or three cameras also becomes uniform.

Further, in the computer program for adjusting gamma values of this embodiment, based on the difference in gamma values among the output data of the respective cameras, the gamma value in the gamma removal table is automatically corrected in advance (S1410, S1411). Accordingly, the brightness of the portion in which the optically overlapped (duplicated overlap) video images are synthesized can be made uniform with the portions in the periphery thereof.

The present invention can be used for the case of generating one piece of video data from multi-split video data to which video data of optically overlapped (duplicated overlap) video images are imparted.

As described above, for the synthesis processing, the processing apparatus of the present invention removes the gamma processing performed on the video data. Then, the processing apparatus of the present invention synthesizes the portions of the optically overlapped (duplicated overlap) video images of the video data from which the gamma processing has been removed. Then, the processing apparatus of the present invention synthesizes the video data together, making the seams uniform and thus invisible. Subsequently, the processing apparatus of the present invention performs the gamma processing appropriately one more time on the synthesized video data. With such processing, by means of digital data as the same data as that output from the camera, the processing apparatus of the present invention can reproduce a one-screen landscape video which is substantially the same as the optical image of the main lens which is free from pixel dropout occurring by splitting the image by splitting means.

Further, in the processing apparatus of the present invention, the gamma addition means performs the gamma processing all together on the one-screen video data completely stitched after the synthesis of the optically overlapped (duplicated overlap) video images. Accordingly, the processing apparatus of the present invention can render the gamma values uniform for the one-screen video image of video images captured by two or three cameras, and can also make uniform the brightness of the one-screen video image of video images captured by two or three cameras.

Further, in the computer program for adjusting gamma values of the present invention, differences between the gamma values in the output data of each of the cameras is adjusted by previously adjusting the gamma values in the gamma removal table. Accordingly, in the computer program for adjusting gamma values of the present invention, the brightness of the portion where the optically overlapped (duplicated overlap) video images are synthesized and the brightness of a peripheral portion thereof can be made uniform.

What is claimed is:

1. A processing apparatus adapted to be used in a video system that includes a main lens onto which light from an object is made incident, a splitting unit operable to split the light transmitted by the main lens, and relay lenses onto which light of video images split by the splitting unit is made incident, the processing apparatus comprising:

a gamma removal unit structured and arranged to remove gamma processing according to a gamma value, the gamma processing performed on video data to which video data of optically overlapped video images are imparted, the optically overlapped video images being generated by setting the splitting unit at a position other than a position where the focal position of the main lens and the focal position of the relay lenses coincide with each other;

an addition unit synthesizing adjacent video data in the video data from which the gamma processing is removed;

a gamma addition unit re-performing gamma processing on the synthesized video data; and a gamma adjustment unit adjusting the gamma value used to remove the gamma processing in the gamma removal unit, by changing gamma values used for each data of the optically overlapped video images in a direction that reduces non-flatness of brightness along a line that traverses across overlapped portions of the video data of optically overlapped video images.

2. The processing apparatus according to claim 1, the gamma removal unit including:

a first gamma removal unit which uses a look up table to remove gamma processing from a first video data to which video data of optically overlapped video images are imparted;

a second gamma removal unit which uses a look up table to remove gamma processing from a second video data to which video data of optically overlapped video images are imparted; and a synthesizing unit synthesizing the first video data and the second video data;

wherein the gamma addition unit uses a look up table to re-perform gamma processing on video data synthesized by the synthesizing unit.

3. The processing apparatus according to claim 1, wherein the gamma adjustment unit includes:

a unit receiving input of a gamma value;

a first unit determining whether or not brightness of a predetermined line is out of a predetermined range, the brightness being brightness of video data of a portion in which a first video data from which gamma processing is removed by the received gamma value and a second video data from which gamma processing is removed by a predetermined gamma value are synthesized;

a second unit determining the brightness of the predetermined line when a result of determination by the first unit indicates that the brightness is out of the predetermined range;

a unit changing at least one of the gamma value used in removing the gamma processing performed on the first video data and the gamma value used in removing the gamma processing performed on the second video data to increase the brightness of the video data of the synthesized portion when the result of the determination by the second unit indicates that the predetermined line is shifted to a darker direction; and a unit causing the determination by the first unit to be performed one more time.

4. A memory for storing a computer program that causes a computer to adjust a gamma value by executing steps of: receiving input of a gamma value; performing a first determining step comprising determining whether or not brightness of a predetermined line is out of a predetermined range, the brightness being brightness of video data of a portion in which a first video data from which gamma processing is removed by the received gamma value and a second video data from which gamma processing is removed by a predetermined gamma value are synthesized; performing a second determining step comprising determining the brightness of the predetermined line when a result of determination by the first determining step indicates that the brightness is out of the predetermined range; changing at least one of the gamma value used in removing the gamma processing performed on the first video data and the gamma value used in removing the gamma processing performed on the second video data to reduce the brightness of the video data of the synthesized portion when a result of determination by the second determining step indicates that the predetermined line is shifted to a brighter direction; changing at least one of the gamma value used in removing the gamma processing performed on the first video data and the gamma value used in removing the gamma processing performed on the second video data to increase the brightness of the video data of the synthesized portion when the result of the determination by the second determining step indicates that the predetermined line is shifted to a darker direction; and causing the determination by the first determining step to be performed one more time.

* * * * *